US012323772B2

(12) United States Patent
Standish et al.

(10) Patent No.: US 12,323,772 B2
(45) Date of Patent: Jun. 3, 2025

(54) EAR-WEARABLE DEVICE WITH FOREIGN MATERIAL TRAP

(71) Applicant: Starkey Laboratories, Inc., Eden Prairie, MN (US)

(72) Inventors: Craig M. Standish, Waconia, MN (US); Thaddeus R. Hoffman, Brooklyn Park, MN (US); Cindy S. Walters, Webster, MN (US); Ganesh Borra, Plymouth, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 124 days.

(21) Appl. No.: 18/141,050

(22) Filed: Apr. 28, 2023

(65) Prior Publication Data

US 2023/0353964 A1 Nov. 2, 2023

Related U.S. Application Data

(60) Provisional application No. 63/336,664, filed on Apr. 29, 2022.

(51) Int. Cl.
*H04R 25/00* (2006.01)

(52) U.S. Cl.
CPC ......... *H04R 25/658* (2013.01); *H04R 25/604* (2013.01); *H04R 25/609* (2019.05); *H04R 2225/0216* (2019.05)

(58) Field of Classification Search
CPC .. H04R 25/658; H04R 25/604; H04R 25/609; H04R 2225/0216

(Continued)

(56) References Cited

U.S. PATENT DOCUMENTS 6,700,983 B1 * 3/2004 Bøgeskov-Jensen ........................ H04R 25/658 381/322
8,792,665 B2 7/2014 Lin
(Continued)

FOREIGN PATENT DOCUMENTS

CN 111131990 5/2020
DE 102007034230 1/2009
(Continued)

OTHER PUBLICATIONS

"The open sound paradigm continues to expand," Oticon Opn concept brochure at least as early as 2017 (19 pages).
(Continued)

*Primary Examiner* — George C Monikang
(74) *Attorney, Agent, or Firm* — Pauly, DeVries Smith & Deffner LLC

(57) ABSTRACT

Embodiments herein relate to ear-wearable devices. In an embodiment, a hearing aid assembly is included having a housing with a top case and a bottom case. The housing defines an electronics cavity between the top case and the bottom case and a housing inlet between the bottom case and the top case. The hearing aid assembly can include an electronics assembly positioned within the electronics cavity, the electronics assembly defining a microphone inlet, wherein an acoustic passageway extends inward from the housing inlet to the microphone inlet. The electronics assembly includes a microphone, and the acoustic passageway includes a front trap portion located below the front microphone inlet. Other embodiments are also included herein.

22 Claims, 18 Drawing Sheets

(58) Field of Classification Search
USPC .......................................... 381/312, 322, 324
See application file for complete search history.

(56) References Cited

U.S. PATENT DOCUMENTS

| | | | |
|---|---|---|---|
| 9,363,589 | B2 | 6/2016 | Lippert et al. |
| 10,993,054 | B2 | 4/2021 | Higgins et al. |
| 2007/0053538 | A1 | 3/2007 | Jensen |
| 2016/0007127 | A1 | 1/2016 | Kennes et al. |
| 2016/0261960 | A1 | 9/2016 | Pedersen et al. |
| 2016/0337764 | A1 | 11/2016 | Flaig et al. |
| 2020/0203812 | A1 | 6/2020 | Murray et al. |
| 2022/0007119 | A1 | 1/2022 | Link et al. |

FOREIGN PATENT DOCUMENTS

| | | |
|---|---|---|
| DE | 102010009781 | 9/2011 |
| WO | 2010117334 | 10/2010 |
| WO | 2021140380 | 7/2021 |

OTHER PUBLICATIONS

"Extended European Search Report," for European Patent Application No. 23169971.1 (corresponding to our file 371.0060USU1) mailed Sep. 29, 2023 (12 pages).

* cited by examiner

EAR-WEARABLE DEVICE WITH FOREIGN MATERIAL TRAP

This application claims the benefit of U.S. Provisional Application No. 63/336,664, filed Apr. 29, 2022, the content of which is incorporated herein by reference in its entirety.

FIELD

Embodiments herein relate to ear-wearable devices and more particularly to an ear-wearable device with a foreign material trap.

BACKGROUND

Modern hearing assistance devices, such as hearing aids, are electronic instruments worn in or around the ear that compensate for hearing losses by specially amplifying sound. Hearing aids typically include an enclosure or housing with one or more openings for a microphone that senses sound, hearing assistance device electronics including processing electronics, and a speaker or receiver to play processed sound for the wearer. One of the recurring problems with such devices is the accumulation of foreign matter interfering with the performance of the internal components. Hearing assistance devices that are ear worn and which have one or more microphones frequently encounter an accumulation of moisture, wax or other foreign material that can occlude apertures for the microphones and cause damage to the microphones eventually. The accumulation of foreign material in hearing assistances devices reduces both the overall lifetime of the device and the maximum time the device can perform adequately between cleanings.

SUMMARY

One general aspect includes a housing may include a top case and a bottom case; the housing being configured to rest against a user's outer ear in a behind-the-ear orientation. The housing defines an electronics cavity between the top case and the bottom case, a front housing inlet between the bottom case and the top case, and a first rear housing inlet between the bottom case and the top case. The assembly also includes an electronics assembly positioned within the electronics cavity of the housing. The electronics assembly defines a front microphone inlet and a rear microphone inlet, where a front acoustic passageway extends inward from the front housing inlet to the front microphone inlet and a rear acoustic passageway extends inward from the first rear housing inlet to the rear microphone inlet. The electronics assembly may include a front microphone, a rear microphone, a front mesh layer covering the front microphone inlet, and a rear mesh layer covering the rear microphone inlet. The front acoustic passageway may include a front trap portion located below the front microphone inlet when the housing is in the behind-the-ear orientation. The rear acoustic passageway may include a first rear trap portion, where the first rear trap portion is positioned below the rear microphone inlet when the housing is in the behind-the-ear orientation.

Implementations of the general aspect may include one or more of the following features.

The front acoustic passageway further may include a front microphone portion adjacent to the front mesh layer and a front lateral portion between the front trap portion and the front microphone portion. The front trap portion is below the front lateral portion when the hearing aid assembly is in the behind-the-ear orientation. The rear acoustic passageway further may include a rear microphone portion adjacent to the rear mesh layer and a rear lateral portion between the first rear trap portion and the rear microphone portion. When the hearing aid assembly is in the behind-the-ear orientation, the first rear trap portion is below the rear lateral portion.

The electronics assembly further may include a microphone circuit board having a top side and a bottom side, where the bottom side is operatively connected to the front microphone and the rear microphone. The microphone circuit board defines the front microphone inlet adjacent to the front microphone and the rear microphone inlet adjacent to the rear microphone. The front mesh layer covers the front microphone inlet and is attached to the top side of the microphone circuit board. The rear mesh layer covers the rear microphone inlet and is attached to the top side of the microphone circuit board.

The inner case may include a top surface, where the top surface of the inner case defines a front microphone opening and a rear microphone opening. The bottom side of the microphone circuit board is attached to the top surface of the inner case so that the front microphone is positioned in the front microphone opening and the rear microphone is positioned in the rear microphone opening.

The second rear housing inlet may be disposed on an opposite side of the housing from the first rear housing inlet, where the rear acoustic passageway extends inward from the second rear housing inlet to the rear microphone inlet.

The rear acoustic passageway may include a second rear trap portion. The second rear trap portion is positioned below the rear microphone inlet when the housing is in the behind-the-ear orientation.

The housing may define a groove between the top case and the bottom case at least in portions adjacent to the front housing inlet and the first rear housing inlet. The groove has a groove depth less than a front trap depth and a first rear trap depth. The groove is defined around a top case exterior perimeter and a bottom case exterior perimeter.

The hearing aid assembly may include a heater configured to warm at least one of the group including the front trap portion and the first rear trap portion. The front hydrophobic coating is not present in surfaces defining the front trap portion, and a rear hydrophobic coating on portions of surfaces defining the rear acoustic passageway. The rear hydrophobic coating is not present on surfaces defining the first rear trap portion.

One general aspect includes a housing which may include a top case and a bottom case. The housing is configured to rest against a user's outer ear in a behind-the-ear orientation. The housing defines an electronics cavity between the top case and the bottom case, a front housing inlet between the bottom case and the top case, a left rear housing inlet between the bottom case and the top case, a right rear housing inlet between the bottom case and the top case. The assembly also includes an electronics assembly positioned within the electronics cavity of the housing, the electronics assembly defining a front microphone inlet and a rear microphone inlet. A front acoustic passageway extends inward from the front housing inlet to the front microphone inlet and a rear acoustic passageway extends inward from the left rear housing inlet and from the right rear housing inlet to the rear microphone inlet. The electronics assembly may include a front microphone, a rear microphone, a front mesh layer covering the front microphone inlet, a front gasket contacting a top case inner surface and a bottom case inner surface, The front gasket may include an interior surface that surrounds a portion of the front acoustic passageway, a rear mesh layer covering the rear microphone inlet, and a rear gasket contacting the top case inner surface and the bottom case inner surface. The rear gasket may include an interior surface that surrounds a portion of the rear acoustic passageway. The assembly also includes where the front acoustic passageway may include a front trap portion located below the front microphone inlet when the housing is in the behind-the-ear orientation. The rear acoustic passageway may include a right rear trap portion and a left rear trap portion, where the right rear trap portion and the left rear trap portion are positioned below the rear microphone inlet when the housing is in the behind-the-ear orientation.

Implementations of the general aspect may include one or more of the following features. The hearing aid assembly may include at least one of: a hydrophilic coating in at least one of the group including the front trap portion, right rear trap portion, and left rear trap portion. The hearing aid assembly may include a front hydrophobic coating on portions of surfaces defining the front acoustic passageway, where the front hydrophobic coating is not present in surfaces defining the front trap portion. The hearing aid assembly may include a rear hydrophobic coating on portions of surfaces defining the rear acoustic passageway, where the rear hydrophobic coating is not present on surfaces defining the right rear trap portion or left rear trap portion.

The electronics assembly further may include a microphone circuit board having a top side and a bottom side, where the bottom side is operatively connected to the front microphone and the rear microphone. The microphone circuit board defines the front microphone inlet adjacent to the front microphone and the rear microphone inlet adjacent to the rear microphone. The front mesh layer covers the front microphone inlet and is attached to the top side of the microphone circuit board. The rear mesh layer covers the rear microphone inlet and is attached to the top side of the microphone circuit board.

The microphone circuit board may include a board exterior perimeter and front protrusion portion, where a front portion of the front gasket is attached to the microphone circuit board along the board exterior perimeter at the front protrusion portion.

The microphone circuit board may include a board exterior perimeter, a right protrusion portion, and a left protrusion portion, where a right portion of the rear gasket is attached to the microphone circuit board along the board exterior perimeter at the right protrusion portion and a left portion of the rear gasket is attached to the microphone circuit board along the board exterior perimeter at the left protrusion portion.

The inner case may include a top surface, where the top surface of the inner case defines a front microphone opening and a rear microphone opening. The bottom side of the microphone circuit board is attached to the top surface of the inner case so that the front microphone is positioned in the front microphone opening and the rear microphone is positioned in the rear microphone opening.

The inner case further may include a right surface and a left surface extending away from the top surface. The microphone circuit board may include a board exterior perimeter, a right protrusion portion, and a left protrusion portion. A right portion of the rear gasket is attached to the microphone circuit board along the board exterior perimeter at the right protrusion portion and a left portion of the rear gasket is attached to the microphone circuit board along the board exterior perimeter at the left protrusion portion. The right protrusion portion extends downward along and is attached to the right surface of the inner case to form the right rear trap portion and where the left protrusion portion extends downward along and is attached to the left surface of the inner case to form the left rear trap portion.

One general aspect includes a method of forming of a hearing aid assembly providing a top case and a bottom case configured to be connected to form a housing the housing being configured to rest against a user's outer ear in a behind-the-ear orientation. The housing defines an electronics cavity between the top case and the bottom case, a front housing inlet between the bottom case and the top case, a left rear housing inlet between the bottom case and the top case, a right rear housing inlet between the bottom case and the top case. The method also includes providing an electronics assembly configured to be positioned within the electronics cavity of the housing. The electronics assembly defining a front microphone inlet and a rear microphone inlet. The electronics assembly may include a front microphone, a rear microphone, a front mesh layer covering the front microphone inlet, and a rear mesh layer covering the rear microphone inlet. The method also includes positioning the electronics assembly within the bottom case and connecting the top case to the bottom case to enclose the electronics assembly. A front acoustic passageway extends inward from the front housing inlet to the front microphone inlet and a rear acoustic passageway extends inward from the left rear housing inlet and from the right rear housing inlet to the rear microphone inlet. The front acoustic passageway may include a front trap portion located below the front microphone inlet when the housing is in the behind-the-ear orientation. The rear acoustic passageway may include a right rear trap portion and a left rear trap portion, where the right rear trap portion and the left rear trap portion are positioned below the rear microphone inlet when the housing is in the behind-the-ear orientation.

Implementations of the general aspect may include one or more of the following features. Providing an electronics assembly further may include providing a microphone circuit board having a top side and a bottom side. The bottom side is operatively connected to the front microphone and the rear microphone. The microphone circuit board defines the front microphone inlet adjacent to the front microphone and the rear microphone inlet adjacent to the rear microphone. The front mesh layer covers the front microphone inlet and is attached to the top side of the microphone circuit board. The rear mesh layer covers the rear microphone inlet and is attached to the top side of the microphone circuit board Providing an electronics assembly further may include attaching the microphone circuit board to an inner case. The inner case may include a top surface, where the top surface of the inner case defines a front microphone opening and a rear microphone opening. The bottom side of the microphone circuit board is attached to the top surface of the inner case so that the front microphone is positioned in the front microphone opening and the rear microphone is positioned in the rear microphone opening.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
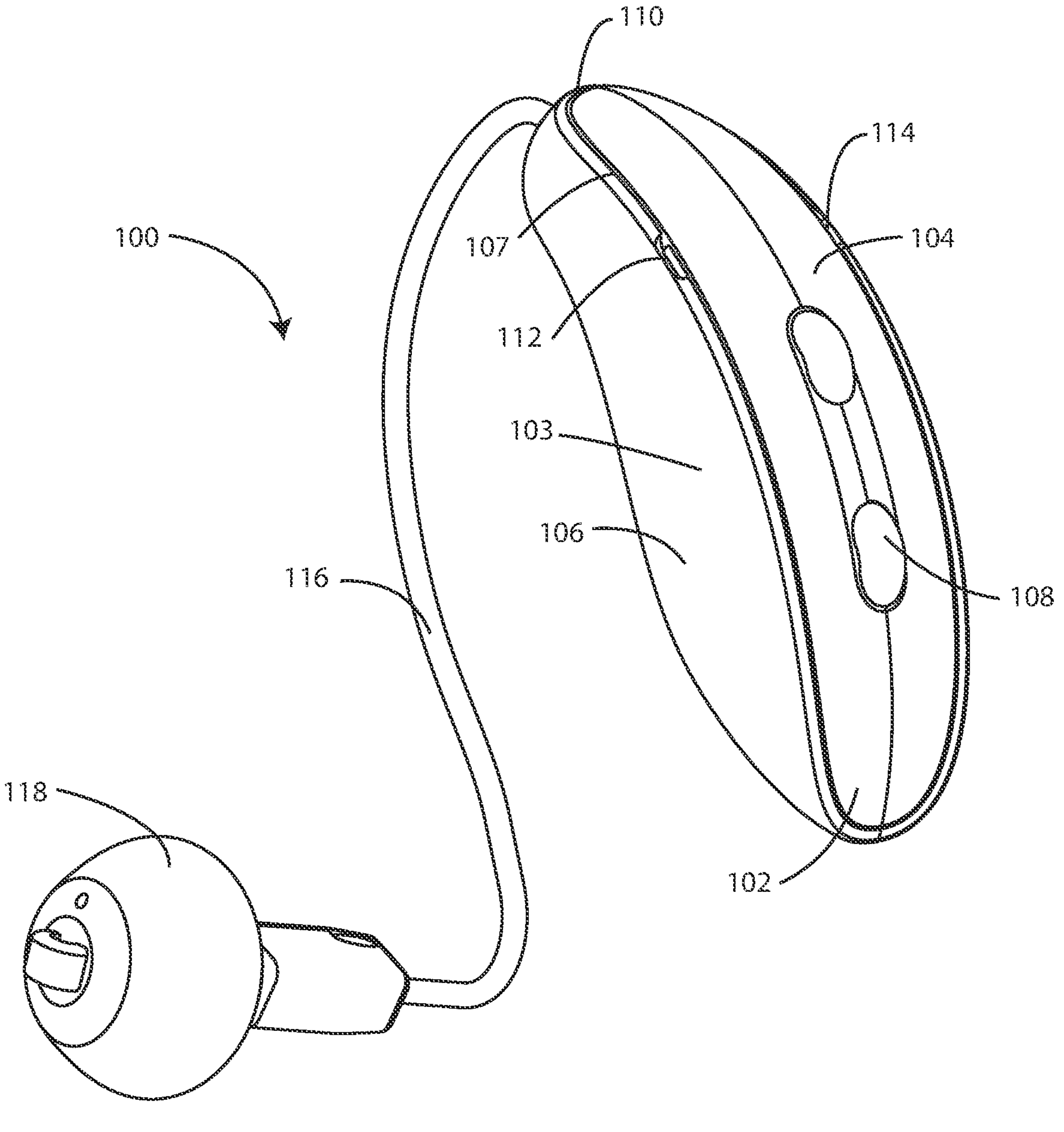
FIG. 1 is a perspective view of a hearing aid assembly in accordance with various embodiments herein.

While embodiments are susceptible to various modifications and alternative forms, specifics thereof have been shown by way of example and drawings and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

A hearing aid assembly with one or more foreign material traps is described herein. The hearing aid assembly is configured to rest against a user's outer ear in a behind-the-ear orientation. The housing is formed from a top case and a bottom case, and one or more housing inlets are defined between the top and bottom case. The hearing aid assembly contains an electronics assembly within the housing that includes at least one microphone inlet leading to at least one microphone. The hearing aid assembly has at least one acoustic passageway extending inward from the housing inlet to the microphone inlet. The acoustic passageway includes a trap portion located below the microphone inlet when the housing is in a behind-the-ear orientation.

While not intending to be bound by theory and not describing all situations, it is believed, that foreign matter will accumulate in the trap portion of the acoustic passageway. Due to gravitational forces, foreign matter will become lodged in the trap portion, leaving an upper portion of the acoustic passageway open for longer, allowing sound waves to propagate along the upper portion of the acoustic passageway to the microphone inlet. This delays the accumulation of foreign matter in the acoustic pathway and on/in the microphone inlet, thus extending the time the hearing aid assembly can perform adequately between cleanings.

The term "hearing aid assembly" as used herein shall refer to devices that can aid a person with impaired hearing. The term "hearing aid assembly" shall also refer to devices that can produce optimized or processed sound for persons with normal hearing. Hearing aid assemblies herein can include hearables (e.g., wearable earphones, headphones, earbuds, virtual reality headsets), hearing aids (e.g., hearing instruments), cochlear implants, and bone-conduction devices, for example. Hearing aid assemblies include, but are not limited to, behind-the-ear (BTE), in-the ear (ITE), in-the-canal (ITC), invisible-in-canal (IIC), receiver-in-canal (RIC), receiver in-the-ear (RITE) or completely-in-the-canal (CIC) type hearing aid assemblies or some combination of the above. In some embodiments, the hearing aid assemblies may comprise a contralateral routing of signal (CROS) or bilateral microphones with contralateral routing of signal (BiCROS) amplification system. In some embodiments herein, a hearing aid assembly may also take the form of a piece of jewelry, including the frames of glasses, which may be attached to the head on or about the ear. The structures and components described herein can also be used in an ear-wearable device that is not a hearing assistance device, such as a medical monitoring device.

Referring now to FIG. 1, a perspective view of a hearing aid assembly is shown in accordance with various embodiments herein. The hearing aid assembly 100 in the embodiment of FIG. 1 is a behind-the-ear (BTE) type device and thus the components are housed behind the ear with a cable leading to an earbud designed to be placed within an ear canal of a wearer. The hearing aid assembly 100 can include a housing 102. In various embodiments, the housing 102 is adapted to be worn on or behind an ear of a wearer. The housing 102 is configured rest against a user's outer ear in a behind-the-ear orientation. The housing 102 can be manufactured utilizing any suitable technique or techniques, e.g., injection-molding, 3D printing, etc. The housing 12 can include any suitable material or materials, e.g., silicone, urethane, acrylates, flexible epoxy, acrylated urethane, and combinations thereof. In various embodiments, the housing can be formed from a top case 104 and a bottom case 106. In some embodiments, the top case 104 is removably attached to the bottom case by means of any of adhesive, a snap fit, press fit, a pin connection, or the like.

In various embodiments, the hearing aid assembly 100 can include user input devices 108. In the example of FIG. 1, the user input devices 108 are disposed on the top case 104 of the housing 102, but other placements are of the user input device are possible. In various embodiments, the user input device 108 can have include one or more, buttons, switches, or the like, such as a first button and a second button. For example, a volume up button and a volume down button can be included in the user input device. In various embodiments the hearing aid user can interact with the user input device 108 (e.g., by pressing one or more buttons) to adjust the volume, change one or more settings, or turn the hearing aid assembly on or off.

In various embodiments, the housing 102 can define an electronics cavity 103 between the top case 104 and the bottom case 106. The electronics cavity 103 can be configured to hold one or more electronic components. The electronic components can be disposed in any suitable location or arrangement within the electronics cavity 103. The hearing aid assembly 100 can include any suitable combination of electronic components as will be further described herein.

In various embodiments, the housing 102 can have a one or more inlets. The inlets are configured provide an entrance to a passageway from the ambient environment to the electronics cavity 103. In some embodiments, the one or more inlets are defined between the top case 104 and the bottom case 106. In the example of FIG. 1, the housing 102 has a front housing inlet 110, a left rear housing inlet 112, and a right rear housing inlet 114, each defined between the bottom case 106 and the top case 104. It should be noted that the housing 102 can have any suitable number of inlets at any suitable location. In some embodiments, the housing 102 can have greater than or equal to 1, 2, 3, 4, or 5 inlets.

In various embodiments, the housing 102 can have a groove 107 defined between the top case 104 and the bottom case 106. In some embodiment, the groove 107 is defined at least in portions adjacent to the front housing inlet 110, the right rear housing inlet 114, and the left rear housing inlet 112. In some embodiments, the groove 107 is defined around a top case exterior perimeter and a bottom case exterior perimeter.

In various embodiments, an exterior surface of the top case 104 defines a portion of the exterior surface of the housing 102 and an exterior surface of the bottom case 106 defines a portion of the exterior surface of the housing. In an embodiment, an exterior surface of the top case 104 and an exterior surface of the bottom case 106 define the entirety of the exterior surface of the housing 102. In various embodiments, an interior surface of the top case 104 defines a portion of electronics cavity 103 and an interior surface of the bottom case 106 defines a portion of the electronics cavity 103. In an embodiment, an interior surface of the top case 104 and an interior surface of the bottom case 106 define the volume of the electronics cavity 103.

The hearing aid assembly 100 can further include an earbud 118 configured to be worn in the ear canal of the user. Any suitable earbud 118 can be utilized with the hearing aid assembly 100. In some examples, the earbud 118 can be a custom-fit earmold or a dome style earbud that doesn't block the entire ear canal opening of the wearer. The earbud 118 can be operatively connected to the electronic components housed in electronics cavity 103 using any suitable technique or techniques. The hearing aid assembly 100 can further include a cable 116 or connecting wire. The cable 116 can include one or more electrical conductors and provide electrical communication between components inside of the housing 102 and the earbud 118. In one or more embodiments, the earbud 118 can be operatively connected to the electronic components disposed within the housing by a cable 116 forming a sound tube that extends between the earpiece and the housing 102.

Figure 2:
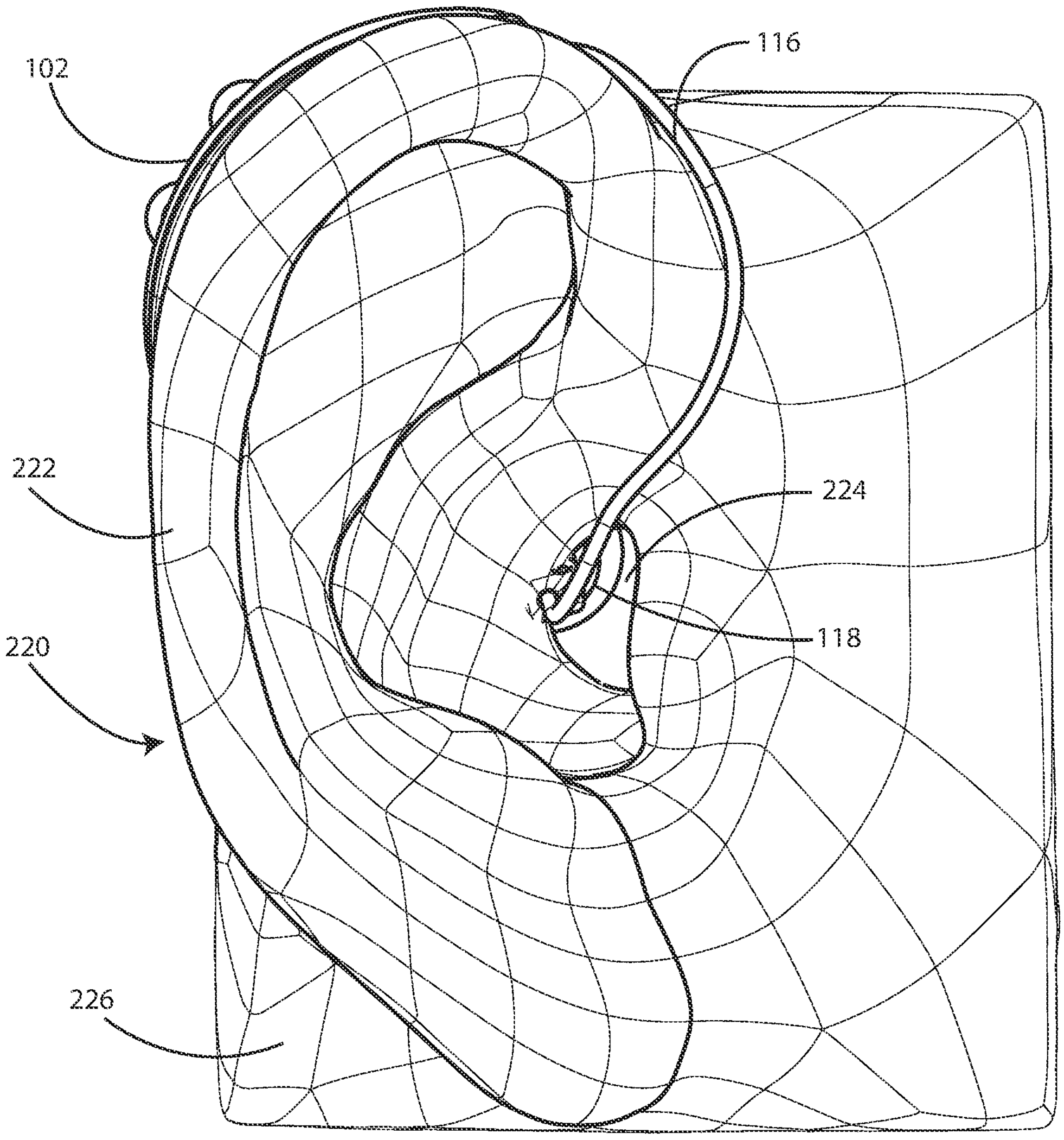
FIG. 2 is a perspective view of a hearing aid assembly in a behind-the-ear orientation in accordance with various embodiments herein.

Referring now to FIG. 2, a perspective view of a hearing aid assembly worn on a user's ear in a behind-the-ear orientation is shown in accordance with various embodiments herein. The hearing aid assembly 100 is configured to be worn by a user such that a housing 102 of the device is disposed between a pinna 222 of an ear 220 of the user or wearer and the skull 226 of the user or wearer. Further, hearing aid assembly 100 includes an earbud 118 disposed in at least a portion of an ear canal 224 of the ear 220 of the wearer. Cable 116 is configured route acoustic and electronic signals from the housing 102 to the earbud 118 of the hearing aid assembly 100.

Figure 3:
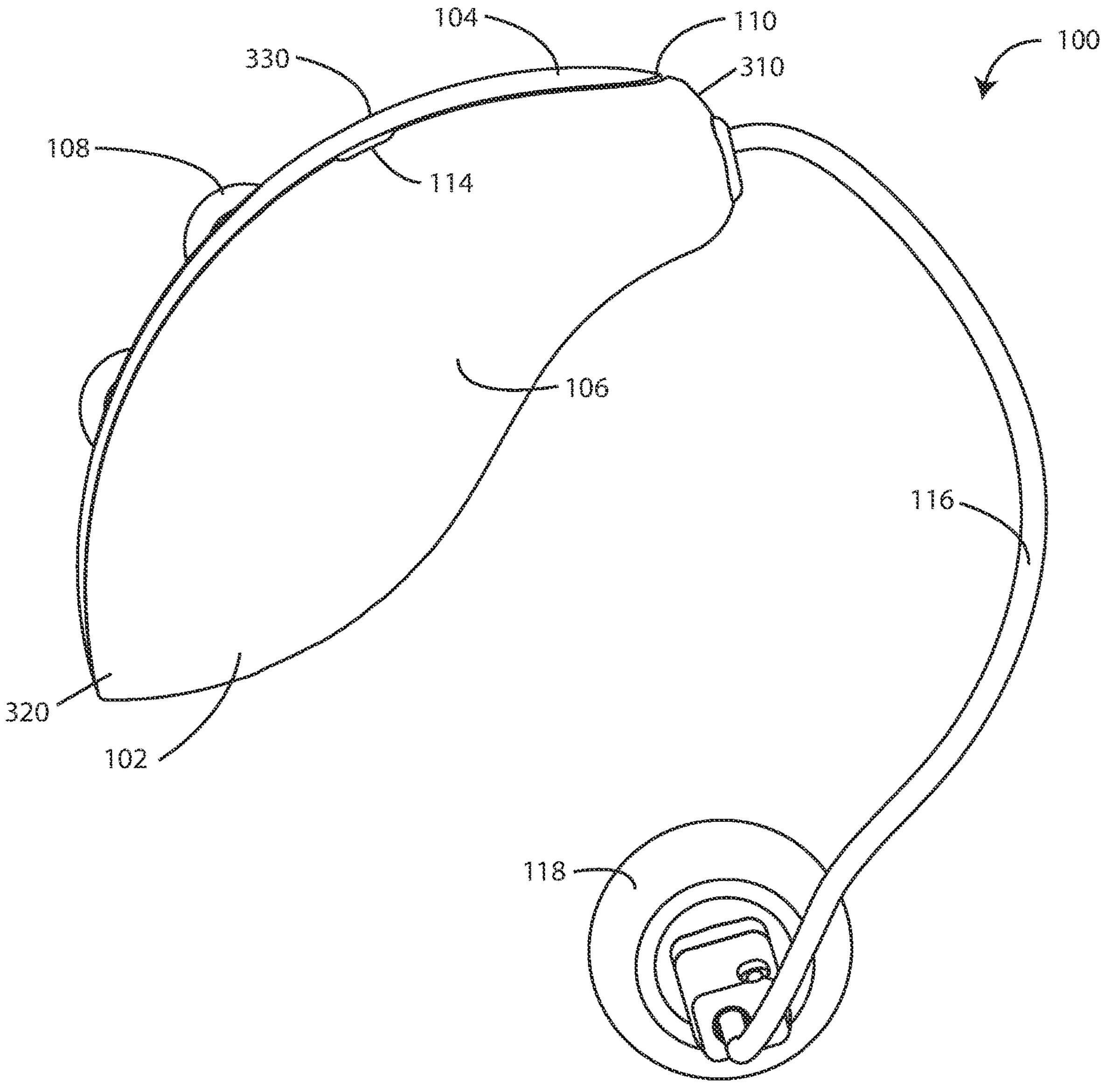
FIG. 3 is a perspective view of hearing aid assembly of FIG. 1 in the behind-the-ear orientation in accordance with various embodiments herein.

Referring now to FIG. 3, a perspective view of hearing aid assembly of FIG. 1 in a behind-the-ear orientation is shown in accordance with various embodiments herein, as it would be positioned when being worn by a user, such as in FIG. 2. The phrase "behind-the-ear orientation" refers to a range of different orientations that the housing can take when worn behind the ear of a user and encompasses the housing being in orientations similar to but not exactly the same as shown in FIG. 3.

A behind-the-ear orientation can be described with reference to the housing portions and sides, where an attachment location for the cable 116 to the housing 102 is a front portion 310 of the housing 102 and an opposite end of the housing 102 is a rear portion 320 of the housing 102. When the hearing aid assembly 100 is in a behind-the-ear orientation, a top surface 330 that includes the user input device 108 is facing generally upward and the front portion 310 is higher than the rear portion 320.

A behind-the-ear orientation can also be described with reference to the position of the inlets with respect to the housing. When the hearing aid assembly 100 is in a behind-the-ear orientation, the front housing inlet 110, left rear housing inlet 112 and right rear housing inlet 114 are facing upward and a majority of the housing is below the inlets.

Figure 4:
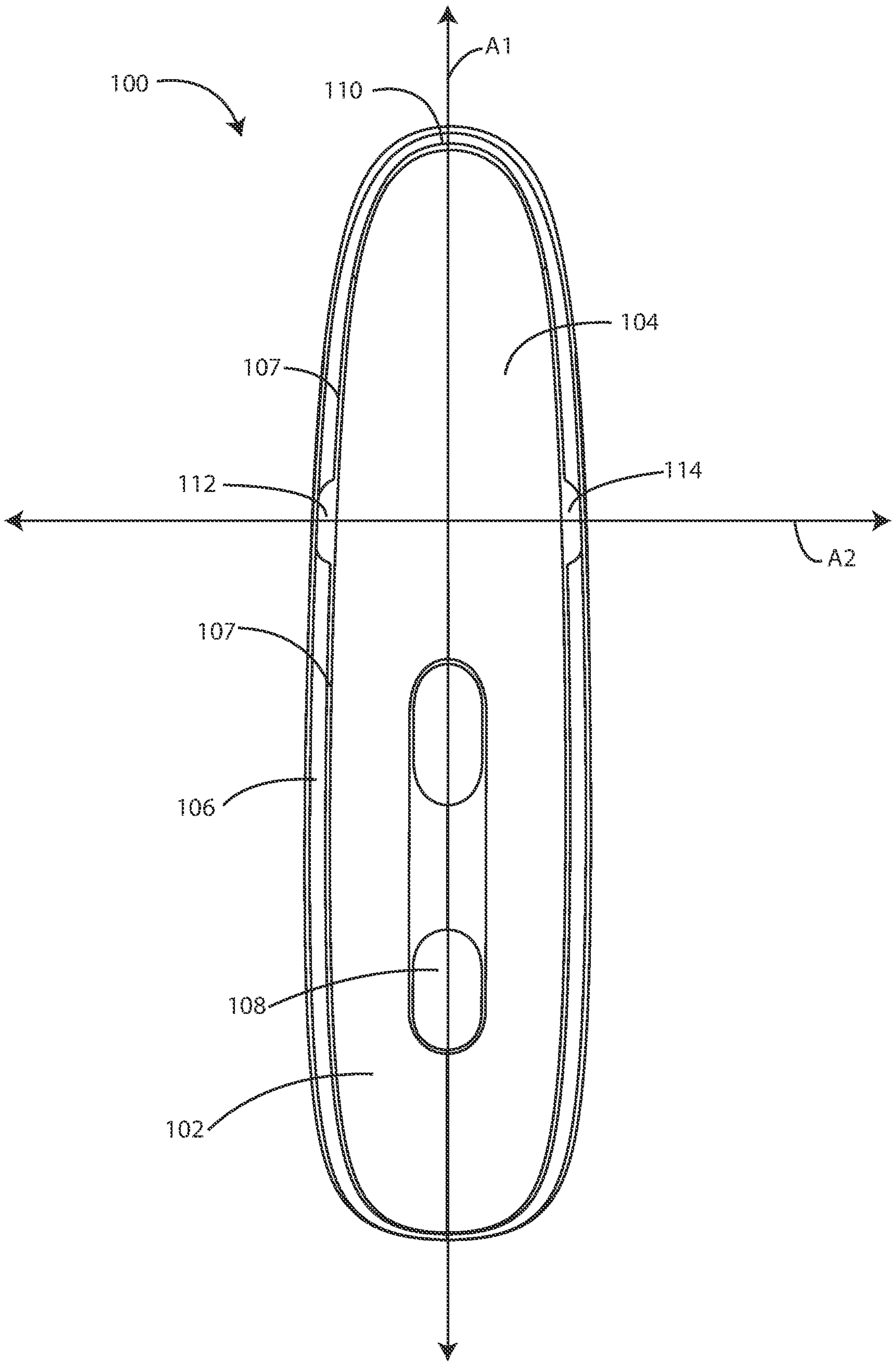
FIG. 4 is a top perspective view of the hearing aid assembly of FIG. 1 in accordance with various embodiments herein.

Referring now to FIG. 4, a top perspective view of the hearing aid assembly of FIG. 1 is shown in accordance with various embodiments herein. The hearing aid assembly 100 can include a housing 102 formed from a top case 104 and a bottom case 106 and a user input device 108. In various embodiments, the housing 102 can have a one or more inlets. The inlets are configured to form an entryway to a passageway from the ambient environment to the electronics cavity 103, more specifically from the ambient environment to a microphone. In some embodiments, the one or more inlets are defined between the top case 104 and the bottom case 106.

In various embodiments, the hearing aid assembly 100 can include a front housing inlet 110 defined between the bottom case 106 and the top case 104. In the example of FIG. 4, the front housing inlet 110 is disposed towards the top of hearing aid assembly 100 along axis A1, which is an axis drawn through the lateral center of the hearing aid assembly 100. In the example of FIG. 4, the front housing inlet 110 is centered about axis A1. The front housing inlet 110 is substantially U shaped and follows the contours of the bottom case 106 and the top case 104.

In various embodiments, the hearing aid assembly 100 can include a first rear housing inlet 112 defined between the bottom case 106 and the top case 104. The first rear housing inlet 112 can be disposed on a first side of the housing 102. The hearing aid assembly 100 can include a second rear housing inlet 114 disposed on an opposite side of the housing form the first rear housing inlet 112. In the embodiment of FIG. 4 the first and second rear housing inlets are disposed on left and right sides of the housing relative to axis A1 and may also be referred to as the left and right rear housing inlets herein. The hearing aid assembly can include two, three, four, or more rear housing inlets defined between the bottom case 106 and the top case 104 at any suitable location on the housing 102.

In various embodiments, the hearing aid assembly 100 can include a left rear housing inlet 112 and a right rear housing inlet 114 defined between the bottom case 106 and the top case 104. The left rear housing inlet 112 and the right rear housing inlet 114 can be disposed beneath the front housing inlet along axis A1. The left rear housing inlet 112 and the right rear housing inlet can be disposed equidistant from one and other with respect to axis A1. The left rear housing inlet 112 and the right rear housing inlet 114 can be disposed substantially parallel to one and other. The left rear housing inlet 112 and the right rear housing inlet 114 can be of substantially the same size and shape. The left rear housing inlet 112 and the right rear housing inlet 114 can be substantially D shaped and follow the contours of the bottom case 106 and the top case 104. While the embodiment of FIG. 4 shows a specific configuration of housing inlets, many other suitable number, size, shape, and configuration of housing inlets is possible.

Figure 5:
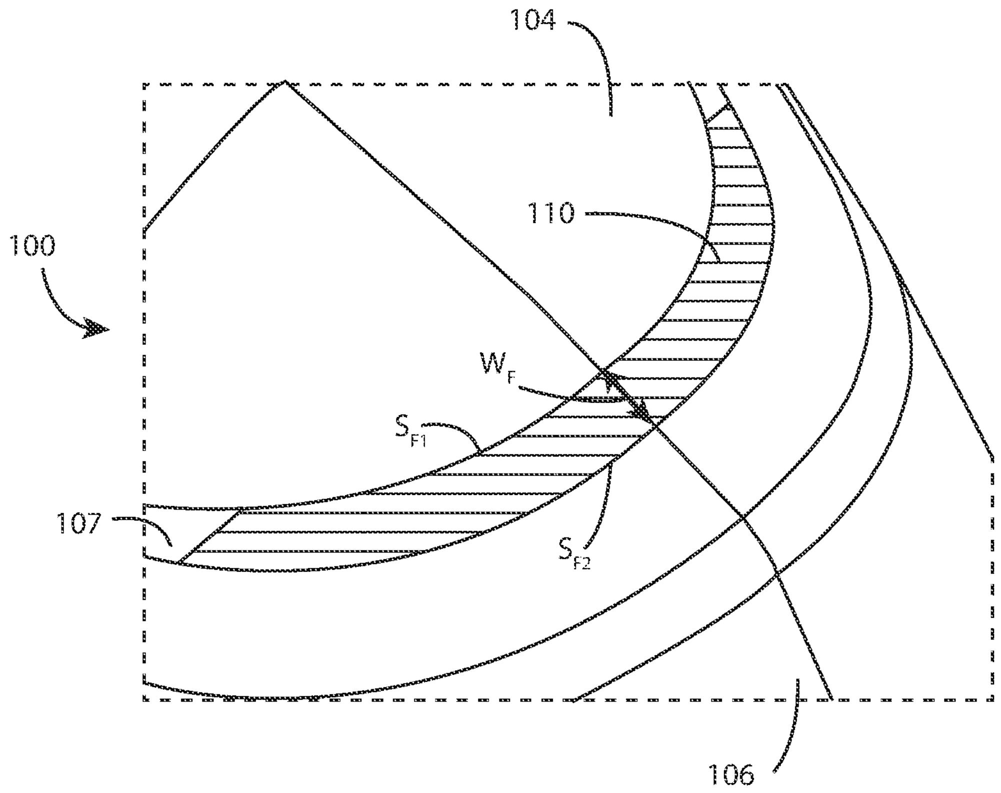
FIG. 5 is a detailed view of the hearing aid assembly showing a front housing inlet in accordance with various embodiments herein.

Referring now to FIG. 5, a detailed view of hearing aid assembly showing the front housing inlet is shown in accordance with various embodiments herein. In various embodiments, the front housing inlet can is substantially U-shaped and defined by two curved surfaces ($S_{F1}$ and $S_{F2}$) and a width ($W_F$).

In some embodiments, the first curved surface $S_{F1}$ is defined by an outer perimeter of the top case 104. In some embodiments, the first curved surface $S_{F1}$ has a length that can be greater than or equal to 2.0 mm, 2.2 mm, 2.4 mm, 2.6 mm, 2.8 mm, or 3.0 mm. In some embodiments, the length can be less than or equal to 3.0 mm, 3.2 mm, 3.4 mm, 3.6 mm, 3.8 mm, or 4.0 mm. In some embodiments, the length can fall within a range of combinations of the preceding values, such as a range of 2.0 mm to 3.0 mm, or 2.2 mm to 3.0 mm, or 2.4 mm to 3.0 mm, or 2.6 mm to 3.0 mm, or 2.8 mm to 3.0 mm, or can be about 3.0 mm.

In some embodiments, the second curved surface $S_{F2}$ is defined by an inner perimeter of the bottom case 106. In some embodiments, the second curved surface $S_{F2}$ has a length that can be greater than or equal to 3.0, 3.2, 3.4, 3.6, 3.8, or 4.0 mm. In some embodiments, the curve length can be less than or equal to 5.0, 4.8, 4.6, 4.4, 4.2, or 4.0 mm. In some embodiments, the curve length can fall within a range of combinations of the preceding values, such as a range of 3.0 to 5.0 mm, or 3.2 to 4.8 mm, or 3.4 to 4.6 mm, or 3.6 to 4.4 mm, or 3.8 to 4.2 mm, or can be about 4.0 mm. In some embodiments, the first curved surface substantially follows the curvature of the second curved surface.

In some embodiments, the width $W_F$ can be greater than or equal to 0.20 mm, 0.21 mm, 0.22 mm, 0.23 mm, 0.24 mm, or 0.25 mm. In some embodiments, the width can be less than or equal to 0.30 mm, 0.29 mm, 0.28 mm, 0.27 mm, 0.26 mm, or 0.25 mm. In some embodiments, the width can fall within a range of combinations of the preceding values, such as a range of 0.20 mm to 0.30 mm, or 0.21 mm to 0.29 mm, or 0.22 mm to 0.28 mm, or 0.23 mm to 0.27 mm, or 0.24 mm to 0.26 mm, or can be about 0.25 mm. In some embodiment, the front housing inlet 110 can span substantially the same width along the length of the first curved surface and the second curve surface. Alternately, the width of front housing inlet 110 can vary along the length between the first curved surface and the second curve surface.

In various embodiments $W_F$ is chosen to be substantially small as to prevent moisture from entering through the front housing inlet. In some embodiments, the front housing inlet is treated with a nanocoating to decrease or prevent moisture from entering through the front housing inlet.

Although the front housing inlet depicted by FIG. 5 is substantially U-shaped, other shapes, sizes, and placements of front hosing inlets are possible. In some configurations, the hearing device may have two or more front housing inlets.

Figure 6:
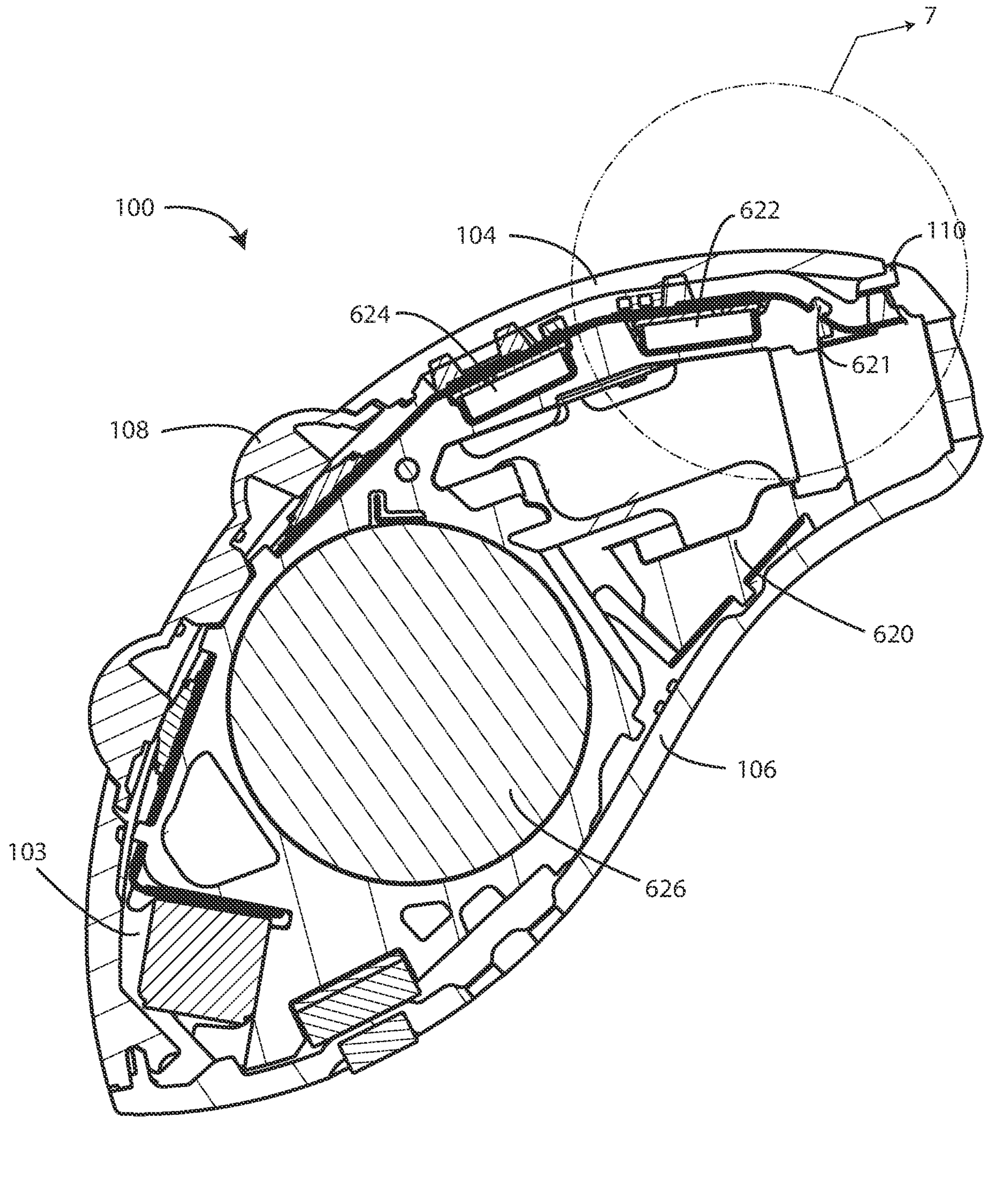
FIG. 6 is a cross sectional view of the of hearing aid assembly of FIG. 4 taken along axis A1 of FIG. 4, in accordance with various embodiments herein.

Referring now to FIG. 6, a cross sectional view of the hearing aid assembly of FIG. 4, taken along axis A1 of FIG. 4, is shown accordance with various embodiments herein. The electronics cavity 103 is defined between the top case 104 and the bottom case 106. The electronics cavity 103 can contain electronics assembly 620. In the example of FIG. 6, the electronics assembly 620 has a front microphone 622 and a rear microphone 624. However, the electronics assembly 620 can contain any suitable number of microphones. In some embodiments, the electronics assembly 620 can have greater than or equal to 1, 2, 3, 4, or 5 microphones. Electronics assembly 620 can include one or more electronic components. Electronics assembly 620 can include one or more additional electronic components, such as a battery 626.

Any suitable microphone or combination of microphones can be utilized. In one or more embodiments, the microphone can be selected to detect one or more audio signals and convert such signals to an electrical signal that is provided to a controller. As will be described in greater detail below, hearing aid assembly 100 can have a controller with an analog-to-digital convertor that converts the electrical signal from the microphone to a digital signal.

Figure 7:
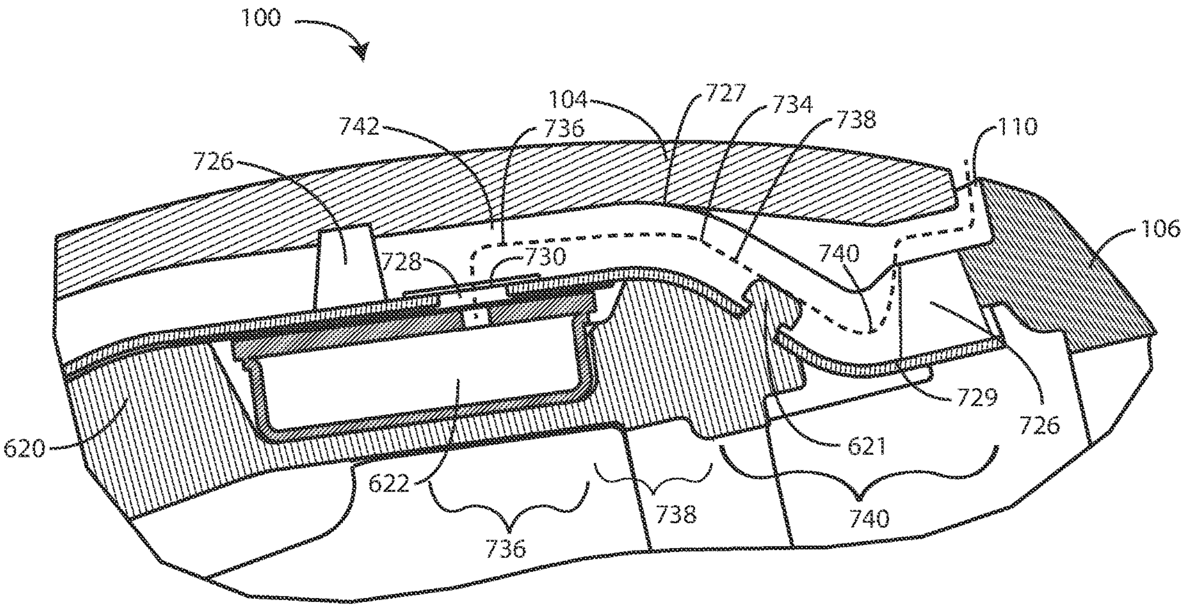
FIG. 7 is a detailed view of the cross-sectional view of FIG. 6 in accordance with various embodiments herein.

Referring now to FIG. 7, a close-up view of a portion of the hearing aid assembly of FIG. 6 is shown in accordance with various embodiments herein. The hearing aid assembly 100 can define a front acoustic passageway 734 that extends inward from the front housing inlet 110 to a front microphone inlet 728. The front microphone inlet 728 is defined in electronics assembly 620 and leads to front microphone 622.

In various embodiments, the hearing aid assembly 100 can include a front housing inlet 110 defined between the bottom case 106 and the top case 104. In various embodiments, the top case 104 defines a first edge of the front housing inlet 110 and the bottom case 106 defines a second edge of front housing inlet. In various the first edge is disposed above the second edge with respect to a plane formed by the front microphone inlet 728 when the housing 102 is in a behind-the-ear orientation. Alternatively, the first edge is disposed parallel to the second edge with respect to a plane formed by the front microphone inlet 728 when the housing 102 is in a behind-the-ear orientation.

In various embodiments, the electronic assembly 620 can include a front mesh layer 730 covering the front microphone inlet 728. The front mesh layer can be any suitable material or materials that is permeable to gasses and impermeable to solids and liquids. In some embodiments, the front mesh layer can be a very fine mesh. Examples of appropriate mesh layers are sold by Saati S.p.A. of Vilano, Italy, under the tradename Acoustex, including SAATI Nanomesh AETHEX™ material or the like. While not intending to be bound by theory, it is believed that including a mesh layer over the microphone inlet can increase the lifespan of the microphone by preventing debris (e.g., earwax, water, oils) from entering the front microphone inlet 728 and contaminating the front microphone 622.

The front acoustic passageway 734 defines a channel through the electronic assembly 620 through which sound waves can propagate. The front acoustic passageway 734 is the area around the dashed line in FIG. 7. The dashed line is an approximate path along which a sound wave may propagate from the front housing inlet 110 to the front microphone inlet 728. It should be understood that sound waves entering the hearing aid assembly though front housing inlet may take varying acoustic paths. In various embodiments, the front acoustic passageway 734 is a torturous acoustic path. For example, the torturous acoustic path may be formed by the relative locations and/or shapes of the front housing inlet 110 and front microphone inlet 728. In various embodiments, the front acoustic passageway 734 can include at least one approximately 90-degree turn. For example, the front acoustic passageway 734 makes an approximately 90-degree turn at the front microphone inlet 728.

In various embodiments, the front acoustic passageway 734 can include a front trap portion 740. The front trap portion 740 is located below a plane formed by the front microphone inlet 728 when the housing 102 is in a behind-the-ear orientation, for example as depicted by FIGS. 2-3. In the embodiment of FIG. 7, the front acoustic passageway 734 makes an approximately U-shaped bend at the front trap portion 740. While not intending to be bound by theory, it is believed, that foreign matter will accumulate in the front trap portion 740 of front acoustic passageway 734. Due to gravitational forces, foreign matter will become lodged in the trap portion while sound waves propagate along the front acoustic passageway 734 to the front microphone inlet 728. This delays the accumulation of foreign matter in an upper portion of the acoustic pathway and on/in the front microphone inlet, thus extending the maximum time the hearing aid assembly 100 can perform adequately between cleanings. Foreign matter as defined herein is any matter other than air that enters the hearing aid assembly and can include skin cells, dust, body oil, food, hairspray, ear wax, water, or the like. It should be understood that the accumulation location of foreign matter is not absolute and can depend on a number of factors including the viscosity of the foreign matter.

In various embodiments, the front acoustic passageway 734 can further include a front microphone portion 736 adjacent to the front mesh layer 730 and a front lateral portion 738 disposed between the front trap portion 740 and the front microphone portion 736. In various embodiments, the front trap portion 740 is disposed below the front lateral portion 738 when the hearing aid assembly is in a behind-the-ear orientation, for example as depicted by FIGS. 2-3. In various embodiments, after propagating through the front trap portion 740 of the front acoustic passageway, the sound waves continue to propagate along the front lateral portion 738 in a trajectory substantially parallel to the plane defined by the front microphone inlet 728. Upon reaching the front microphone portion 736 of the front acoustic passageway, the sound waves enter the front microphone inlet 728 through the front mesh layer.

In various embodiment, the electronic assembly 620 can include a front gasket 726. The front gasket 726 can contact a top case inner surface 727 and a bottom case inner surface 729. The front gasket can include a front gasket interior surface 742 that surrounds a portion of the front acoustic passageway 734. In some embodiments, the height of the front gasket 726 can be greater than or equal to 0.28, 0.29, 0.31, or 0.32 mm. In some embodiments, the height of the front gasket 726 can be less than or equal to 0.38, 0.36, 0.34, or 0.32 mm. In some embodiments, the height of the front gasket 726 can fall within a range of 0.28 to 0.38 mm, or 0.29 to 0.36 mm, or 0.31 to 0.34 mm, or can be about 0.32 mm.

Figure 8:
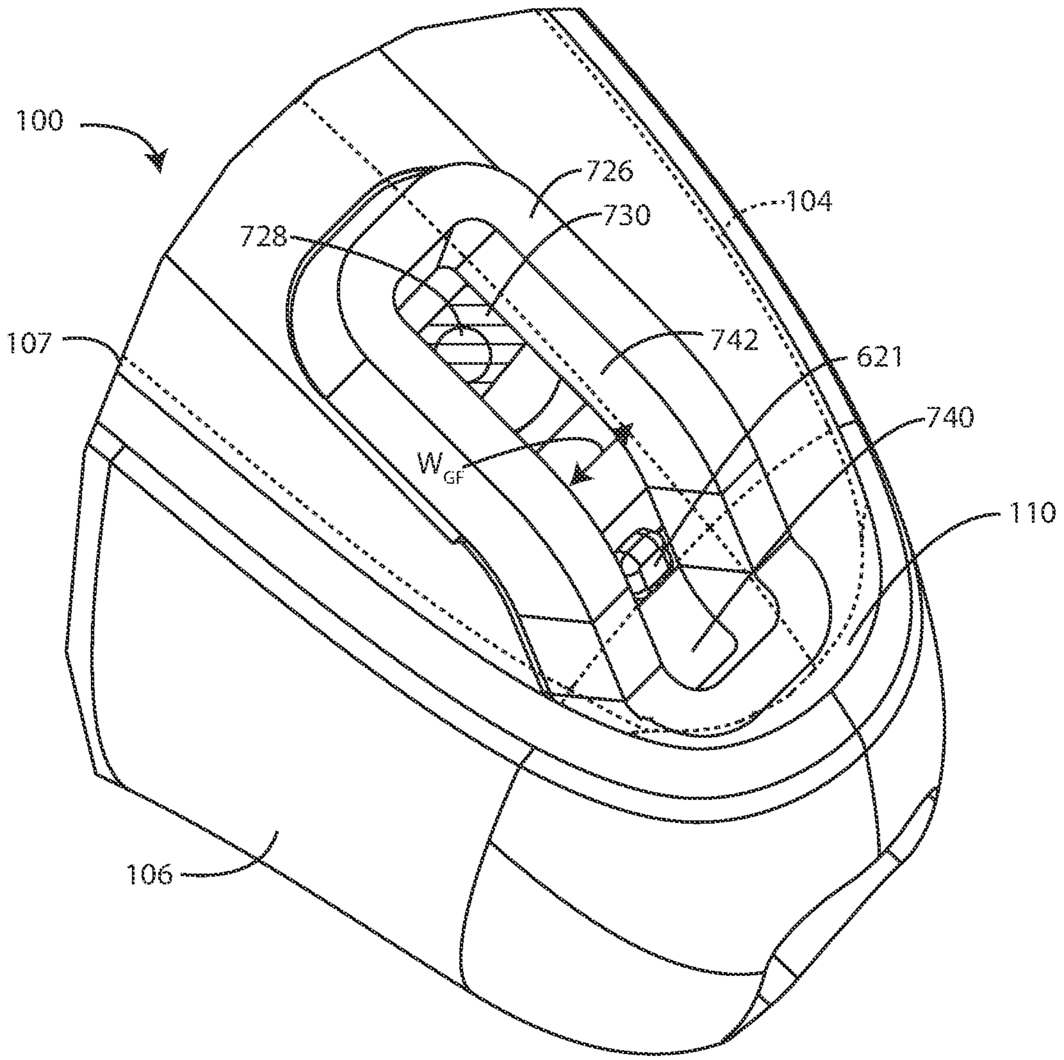
FIG. 8 is a detailed perspective view of a front end of the hearing aid assembly, in accordance with various embodiments herein.

Referring now to FIG. 8, a close-up top view of the hearing aid assembly at the front housing inlet 110 is shown in accordance with various embodiments herein. In the embodiment of FIG. 8, the top case 104 is shown only in dashed lines and the components beneath the top case are shown as if the top case 104 was transparent for clarity. A top view of the front acoustic passageway 734 is visible in FIG. 8, leading from the front housing inlet 110 to the front microphone inlet 728, which is depicted under the front mesh layer 730.

In various embodiments, the electronic assembly 620 can include a front gasket 726 surrounding portions of the front acoustic passageway 734. The front gasket 726 can contact a top case inner surface 727 and a bottom case inner surface 729. The front gasket can include can front gasket interior surface 742 that surrounds a portion of the front acoustic passageway 734.

The front gasket 726 can be formed from any number of suitable materials. The front gasket 726 can be formed from a material configured to conform to the top case 104 and bottom case 106 of hearing aid assembly 100 such as foam.

In various embodiments, the front gasket 726 is configured to define at least a portion of the front acoustical path from the front housing inlet 110 to the front microphone inlet 728. In various embodiments, the front gasket 726 is configured to isolate the front acoustic passageway from the other components in the device. While not intending to be bound by theory, it is believed that the front gasket 726 can limit interference from other components housed in the hearing aid assembly and the improve the quality of the sound reaching the front microphone 622.

In various embodiments the inner boundary of the front gasket 726 defines a boundary of the front acoustic passageway 734. In various embodiments, the width of the front acoustic passageway 734 is defined by an inner width of the front gasket 726. The inner width of the front gasket $W_{GF}$ is defined herein as the distance between the two parallel inner surfaces of the front gasket 726. In some embodiments, the width $W_{GF}$ can be greater than or equal to 1.30, 1.32, 1.33, or 1.35 mm. In some embodiments, the width $W_{GF}$ can be less than or equal to 1.40, 1.38, 1.37, or 1.35 mm. In some embodiments, the width $W_{GF}$ can fall within a range of 1.30 to 1.40 mm, or 1.32 to 1.38 mm, or 1.33 to 1.37 mm, or can be about 1.35 mm.

In various embodiments, the front gasket 726 can be substantially rectangular with rounded corners and bent to conform to the front acoustic passageway 734. In various embodiments, a lower portion of the front gasket 726 extends into the bottom case 106 of the hearing aid assembly and front gasket interior surface 742 defines at least a portion of the front trap portion 740.

In an embodiment, the front trap portion 740 can be defined by a volume bounded at the top by the front housing inlet 110, at the bottom by the bottom case inner surface 729, and the sides by the two parallel inner surfaces of the front gasket 726. In some embodiments, the volume of the front trap portion can be greater than or equal to 0.0012 milliliters (mL), 0.0013 mL, 0.0014 mL, 0.0016 mL, or 0.0017 mL. In some embodiments, the volume can be less than or equal to 0.0022 mL, 0.0021 mL, 0.0020 mL, 0.0018 mL, or 0.0017 mL. In some embodiments, the volume can fall within a range of 0.0012 mL to 0.0022 mL, or 0.0013 mL to 0.0021 mL, or 0.0014 mL to 0.0020 mL, or 0.0016 mL to 0.0018 mL, or can be about 0.0017 mL.

Figure 9:
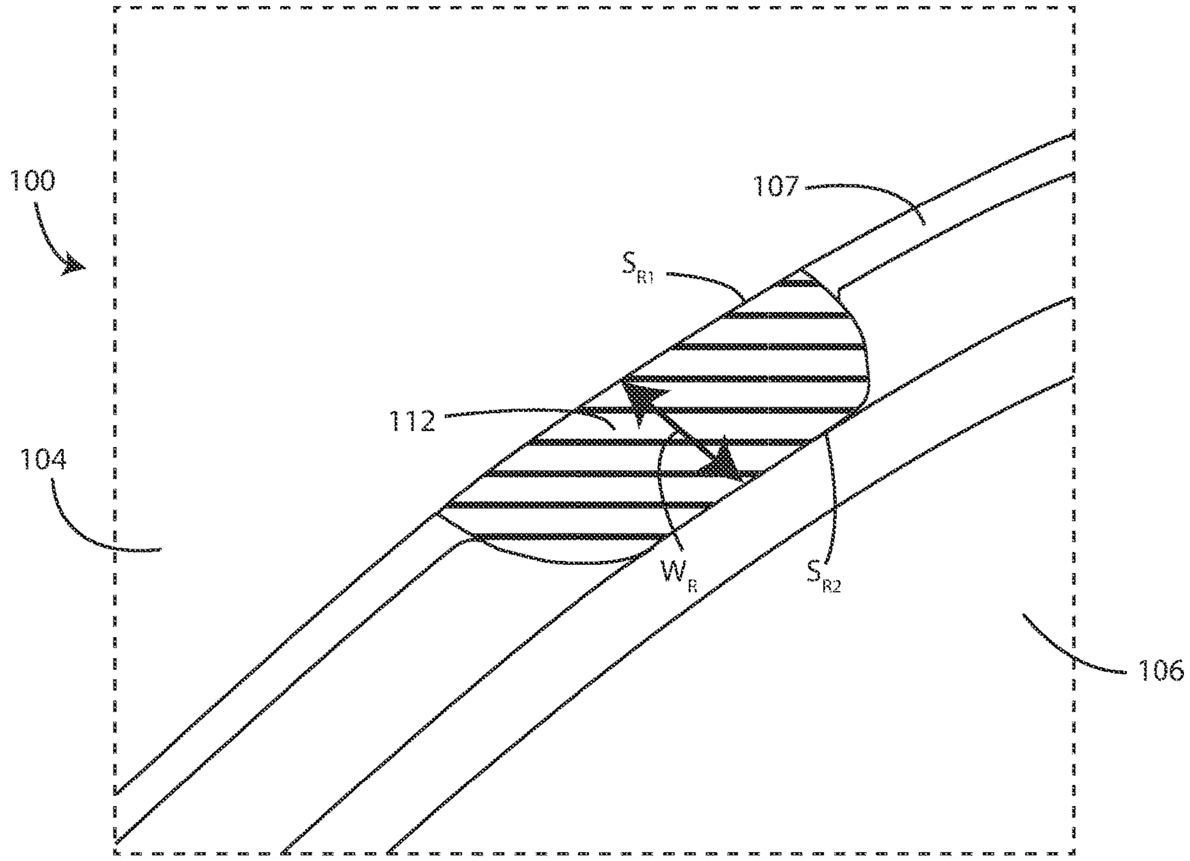
FIG. 9 is a close-up view of a portion of the hearing aid assembly including a left rear housing inlet in accordance with various embodiments herein.

Referring now to FIG. 9, a close-up view of the portion of the hearing aid assembly including the left rear housing inlet is shown in accordance with various embodiments herein. In various embodiments, the left rear housing inlet 112 can is substantially D-shaped and defined between two surfaces ($S_{R1}$ and $S_{R2}$) and having a center width ($W_F$).

In some embodiments, the first surface $S_{R1}$ is defined by an outer perimeter of the top case 104. In some embodiments, the first surface $S_{R1}$ has a length that can be greater than or equal to 2.0 mm, 2.1 mm, 2.2 mm, 2.3 mm, 2.4 mm, or 2.5 mm. In some embodiments, the length of first surface $S_{R1}$ can be less than or equal to 3.0 mm, 2.9 mm, 2.8 mm, 2.7 mm, 2.6 mm, or 2.5 mm. In some embodiments, the length of first surface $S_{R1}$ can fall within a range defined by any combination of the preceding values, such as a range of 2.0 mm to 3.0 mm, or 2.1 mm to 2.9 mm, or 2.2 mm to 2.8 mm, or 2.3 mm to 2.7 mm, or 2.4 mm to 2.6 mm. In some embodiments, the length of first surface $S_{R1}$ can be about 2.5 mm.

In some embodiments, the second surface $S_{R2}$ is defined by an inner perimeter of the bottom case 106. In some embodiments, the second surface $S_{R2}$ has a length that can be greater than or equal to 1.5 mm, 1.6 mm, 1.7 mm, 1.8 mm, 1.9 mm, or 2.0 mm. In some embodiments, the length of second surface $S_{R2}$ can be less than or equal to 2.5 mm, 2.4 mm, 2.3 mm, 2.2 mm, 2.1 mm, or 2.0 mm. In some embodiments, the length of second surface $S_{R2}$ can fall within a range defined by any combination of the preceding values, such as a range of 1.5 mm to 2.5 mm, or 1.6 mm to 2.4 mm, or 1.7 mm to 2.3 mm, or 1.8 mm to 2.2 mm, or 1.9 mm to 2.1 mm. In some embodiments, the length of second surface $S_{R2}$ can be about 2.0 mm. In some embodiments, the first surface $S_{R1}$ is substantially parallel to the second surface $S_{R2}$.

In some embodiments, the central width $W_R$ can be greater than or equal to 0.20 mm, 0.21 mm, 0.22 mm, 0.23 mm, 0.24 mm, or 0.25 mm. In some embodiments, the width $W_R$ can be less than or equal to 0.30 mm, 0.29 mm, 0.28 mm, 0.27 mm, 0.26 mm, or 0.25 mm. In some embodiments, the width $W_R$ can fall within a range defined by any combination of the preceding values, such as a range of 0.20 mm to 0.30 mm, or 0.21 mm to 0.29 mm, or 0.22 mm to 0.28 mm, or 0.23 mm to 0.27 mm, or 0.24 mm to 0.26 mm, or can be about 0.25 mm. In some embodiment, the left rear housing inlet 112 can span substantially the same width along the length of the first curved surface and the second curved surface. Alternately, the width of left rear housing inlet 112 can vary along the length of the first curved surface and the second curved surface.

In various embodiments the central width $W_R$ is chosen to be substantially small as to prohibit moisture from entering through the rear housing inlet. In some embodiments, the rear housing inlet is treated with a nanocoating to reduce or prevent moisture from entering through the rear housing inlet.

Although the left rear housing inlet depicted by FIG. 9 is substantially D-shaped, other shapes, sizes, and placements of front hosing inlets are possible. In some configurations, the hearing device may have two or more left rear housing inlets.

While FIG. 9 depicts the left rear housing inlet 112, the above disclosure is equally applicable to the right rear housing inlet 114, which is a mirror image of the left rear housing inlet 112 in various embodiments.

Figure 10:
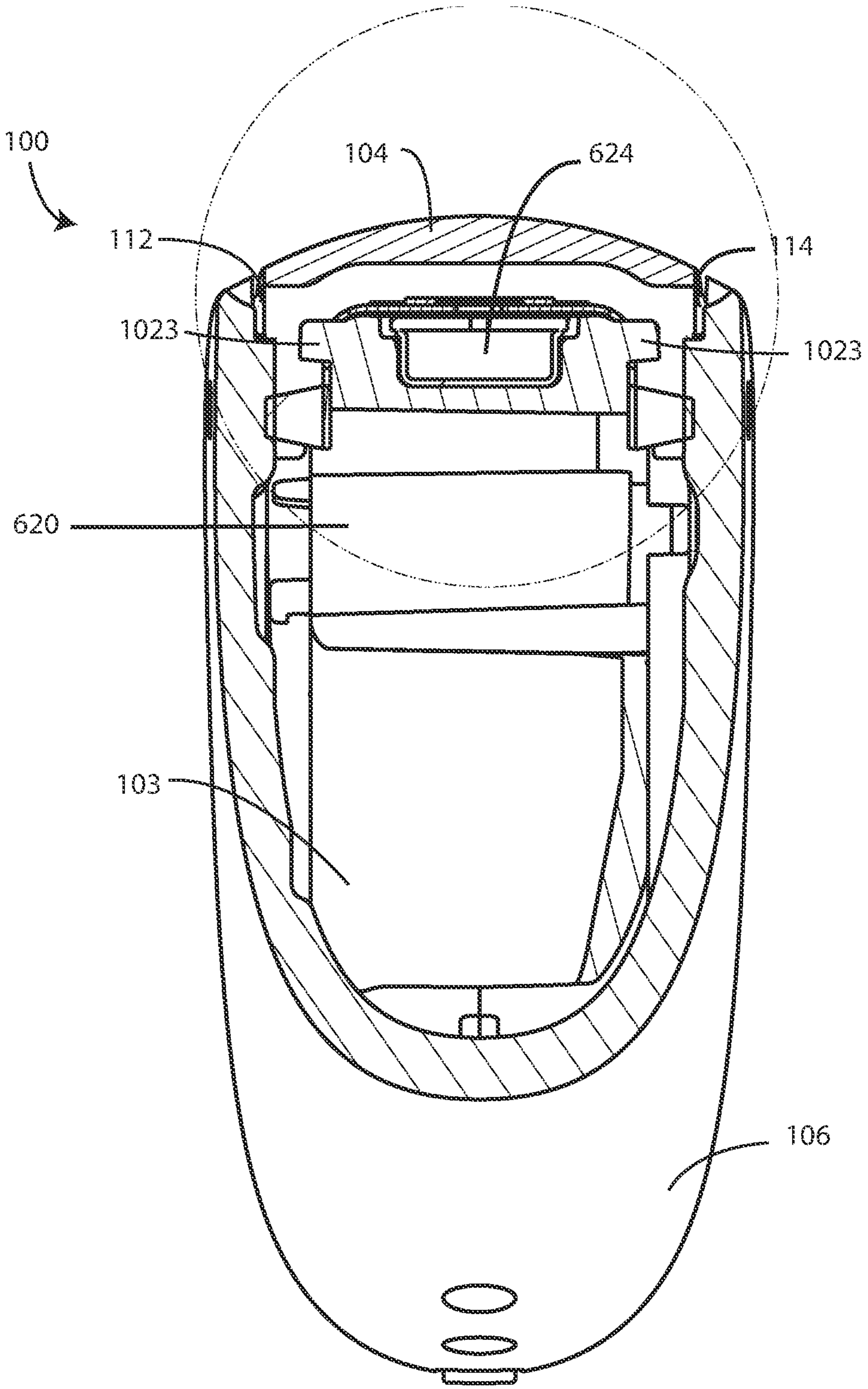
FIG. 10 is a cross sectional view of the hearing aid assembly of FIG. 4 taken along axis A2 of FIG. 4, in accordance with various embodiments herein.

Referring now to FIG. 10, a cross sectional view of the of hearing aid assembly of FIG. 4 taken along axis A2 is shown accordance with various embodiments herein. Electronics assembly 620 can have one or more electronic components including a rear microphone 624.

Figure 11:
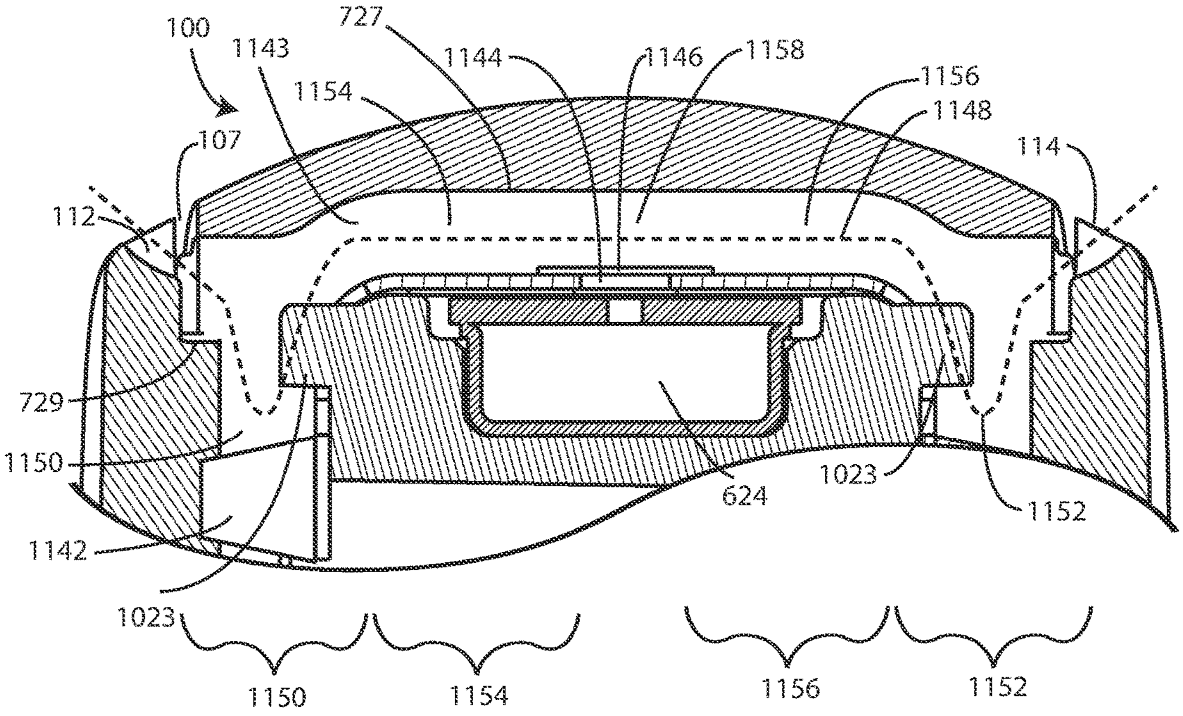
FIG. 11 is a detailed view of the cross-sectional view of FIG. 10, in accordance with various embodiments herein.

Referring now to FIG. 11, a detailed, close-up view of a portion of the hearing aid assembly of FIG. 10 is shown in accordance with various embodiments herein. The electronics assembly can have a rear microphone inlet 1144. The rear microphone inlet 1144 is an opening defined in electronics assembly 620 leading to rear microphone 624.

In various embodiments, the hearing aid assembly 100 can include a left rear housing inlet 112 and right rear housing inlet 114 defined between the bottom case 106 and the top case 104. In various embodiments, the top case 104 defines a first edge of the left rear housing inlet 112 and right rear housing inlet and the bottom case 106 defines a second edge of the left rear housing inlet 112 and right rear housing inlet. In various the first edge is disposed above the second edge with respect to a plane formed by the rear microphone inlet 1144 when the housing 102 is in a behind-the-ear orientation. Alternatively, the first edge is disposed parallel to the second edge with respect to a plane formed by the rear microphone inlet 1144 when the housing 102 is in a behind-the-ear orientation.

In various embodiments, the electronic assembly 620 can include a rear mesh layer 1146 covering the rear microphone inlet 1144. The rear mesh layer can be any suitable material or materials that is permeable to gasses and impermeable to solids and liquids. In various embodiments, rear mesh layer 1146 is formed form the same material as options for the front mesh layer 730. In various embodiments, rear mesh layer 1146 is formed form the same material as the front mesh layer 730.

The hearing aid assembly 100 can define a rear acoustic passageway 1148 that extends inward from the left rear housing inlet 112 and from the right rear housing inlet 114 to the rear microphone inlet 1144. The rear acoustic passageway 1148 defines a channel through the electronic assembly 620 through which sound waves can propagate. The rear acoustic passageway 1148 is the area surrounding the dashed line in FIG. 11, which is intended as an approximate acoustic path along which a sound wave may propagate from the left rear housing inlet 112 and from the right rear housing inlet 114 to the rear microphone inlet 1144. It should be understood that sound waves entering the hearing aid assembly though left rear housing inlet 112 or the right rear housing inlet 114 may take varying acoustic paths. In various embodiments, the rear acoustic passageway 1148 is a torturous acoustic path. For example, the torturous acoustic path may be formed by the relative locations and/or shapes of left rear housing inlet 112, the right rear housing inlet 114, and the rear microphone inlet 1144. In various embodiments, the rear acoustic passageway 1148 can include at least one approximately 90-degree turn. For example, the passageway makes an approximately 90-degree turn at the rear microphone inlet 1144.

In various embodiments, the rear acoustic passageway 1148 can include a right rear trap portion 1152 and a left rear trap portion 1150. The right rear trap portion 1152 and a left rear trap portions 1150 are both located below a plane formed by the rear microphone inlet 1144 when the housing 102 is in a behind-the-ear orientation. In the embodiment of FIG. 11, the rear acoustic passageway 1148 makes an approximately U-shaped at both the right rear trap portion 1152 and the left rear trap portion 1150. As described in detail above, it is believed, that foreign matter will accumulate in the right rear trap portion 1152 and left rear trap portion 1150 of rear acoustic passageway 1148. Due to gravitational forces, foreign matter will become lodged in the trap portions while sound waves propagate along an upper portion of the rear acoustic passageway 1148 to the rear microphone inlet 1144.

In various embodiments, the rear acoustic passageway 1148 can further include a rear microphone portion 1158 adjacent to the rear mesh layer 1146, a rear right lateral portion 1156 between the right rear trap portion 1152 and the rear microphone portion 1158, and a left rear left lateral portion 1154 between the rear left rear trap portion 1150 and the rear microphone portion 1158. In various embodiments, the right rear trap portion 1152 is disposed below the rear right lateral portion 1156 when the hearing aid assembly is in a behind-the-ear orientation. In various embodiments, the left rear trap portion 1150 is disposed below the left lateral portion 1154 when the hearing aid assembly is in a behind-the-ear orientation. In various embodiments, after propagating through the rear left rear trap portion 1150 or the rear right rear trap portion 1152 rear acoustic passageway, the sound waves continue to propagate along the respective rear lateral portion 1154, 1156 in a trajectory substantially parallel to the plane defined by the rear microphone inlet 1144. Upon reaching the rear microphone inlet 1144 of the rear acoustic passageway, the sound waves make enter the rear microphone inlet 1144 through the rear mesh layer.

In various embodiment, the electronic assembly 620 can include a rear gasket 1142. The rear gasket 1142 can contact a top case inner surface 727 and a bottom case inner surface 729. The rear gasket can include a rear gasket interior surface 1143 that surrounds a portion of the rear acoustic passageway 1148. In some embodiments, the height of the rear gasket 1142 can be less than or equal to 0.38, 0.36, 0.34, or 0.32 mm. In some embodiments, the height of the rear gasket 1142 can fall within a range of 0.28 to 0.38 mm, or 0.29 to 0.36 mm, or 0.31 to 0.34 mm, or can be about 0.32 mm.

Figure 12:
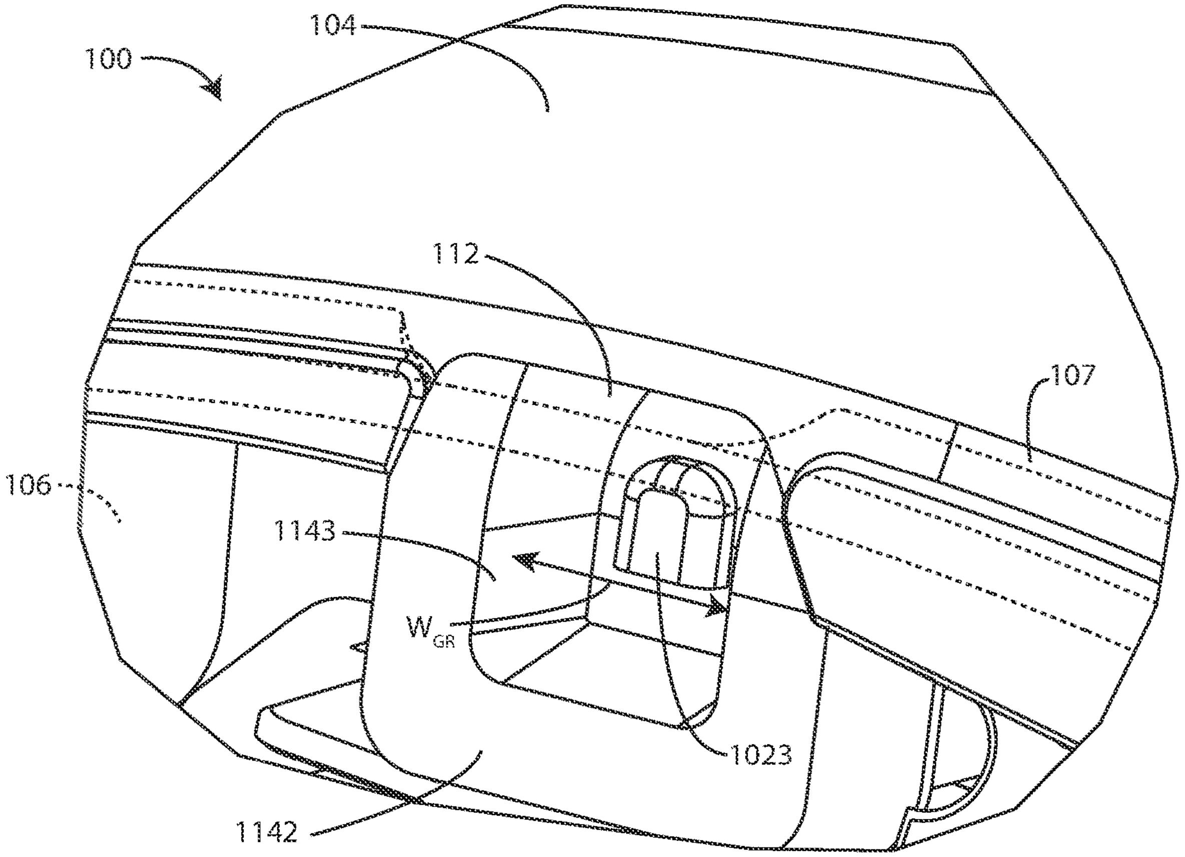
FIG. 12 is a detailed perspective view of a rear portion of the hearing aid assembly in accordance with various embodiments herein.

Referring now to FIG. 12, a closed-up perspective view of a portion of the hearing aid assembly including the left rear housing inlet is shown in accordance with various embodiments herein. In the embodiment of FIG. 12, the bottom case 106 is drawn in dashed lines and the components under the bottom case 106 are shown as if the bottom case 106 was transparent for clarity.

In various embodiment, the electronic assembly 620 can include a rear gasket 1142. The rear gasket 1142 can contact a top case inner surface 727 and a bottom case inner surface 729. The rear gasket can include a rear gasket interior surface 1143 that surrounds a portion of the rear acoustic passageway 1148.

The rear gasket 1142 can be formed from any number of suitable materials. The rear gasket 1142 can be formed from a material configured to conform to the top case 104 and bottom case 106 of hearing aid assembly 100 such as foam or other materials including the options described as options for the front gasket. In various embodiments, the rear gasket 1142 is formed form the same material as the front gasket 726.

In various embodiments, the rear gasket 1142 is configured to define at least a portion of an acoustical path from the left rear housing inlet 112 and the right rear housing inlet to the rear microphone inlet 1144. In various embodiments, the rear gasket 1142 is configured to isolate the rear acoustic passageway from the rest of the components in the device. While not intending to be bound by theory, it is believed that the rear gasket can limit interreference from other components housed in the hearing aid assembly and the improve the quality of the sound waves propagating to the rear microphone inlet.

In various embodiments the inner boundary of the rear gasket 1142 defines a boundary of the rear acoustic passageway 1148. In various embodiments, the width of the rear acoustic passageway 1148 is defined by an inner width of the rear gasket 1142. The inner width of the rear gasket $W_{GR}$ is defined herein as the distance between the two parallel inner surfaces of the rear gasket 1142. In some embodiments, the width $W_{GR}$ can be greater than or equal to 1.30, 1.32, 1.33, or 1.35 mm. In some embodiments, the width $W_{GR}$ can be less than or equal to 1.40, 1.38, 1.37, or 1.35 mm. In some embodiments, the width $W_{GR}$ can fall within a range of 1.30 to 1.40 mm, or 1.32 to 1.38 mm, or 1.33 to 1.37 mm, or can be about 1.35 mm.

In various embodiments, the rear gasket 1142 can be substantially rectangular shaped with rounded corners and bent to conform to the rear acoustic passageway defining a first U-shaped end at the left rear housing inlet 112 and a second U-shaped end at the right rear housing inlet 114. In various embodiments, the first end of the rear gasket 1142 extends into the bottom case 106 of the hearing aid assembly and rear gasket interior surface 1143 defines at least a portion of the left rear trap portion 1150. In various embodiments, the second end of the rear gasket 1142 extends into the bottom case 106 of the hearing aid assembly and rear gasket interior surface 1143 defines at least a portion of the right rear trap portion 1152.

In an embodiment, the right rear trap portion 1152 can be defined by a volume bounded at the top by the right rear housing inlet 114, at the bottom by the bottom case inner surface 729, and the sides by the two parallel inner surfaces of the rear gasket 1142. The left rear trap portion is similarly defined by the structures on the left side. In some embodiments, the volume of each rear trap portion can be greater than or equal to 0.0018 mL, 0.0019 mL, 0.0020 mL, 0.0022 mL, 0.0023 mL, or 0.0024 mL. In some embodiments, the volume can be less than or equal to 0.0030 mL, 0.0029 mL, 0.0028 mL, 0.0026 mL, 0.0025 mL, or 0.0024 mL. In some embodiments, the volume can fall within a range of 0.0018 mL to 0.0030 mL, or 0.0019 mL to 0.0029 mL, or 0.0020 mL to 0.0028 mL, or 0.0022 mL to 0.0026 mL, or 0.0023 mL to 0.0025 mL, or can be about 0.0024 mL.

Figure 13:
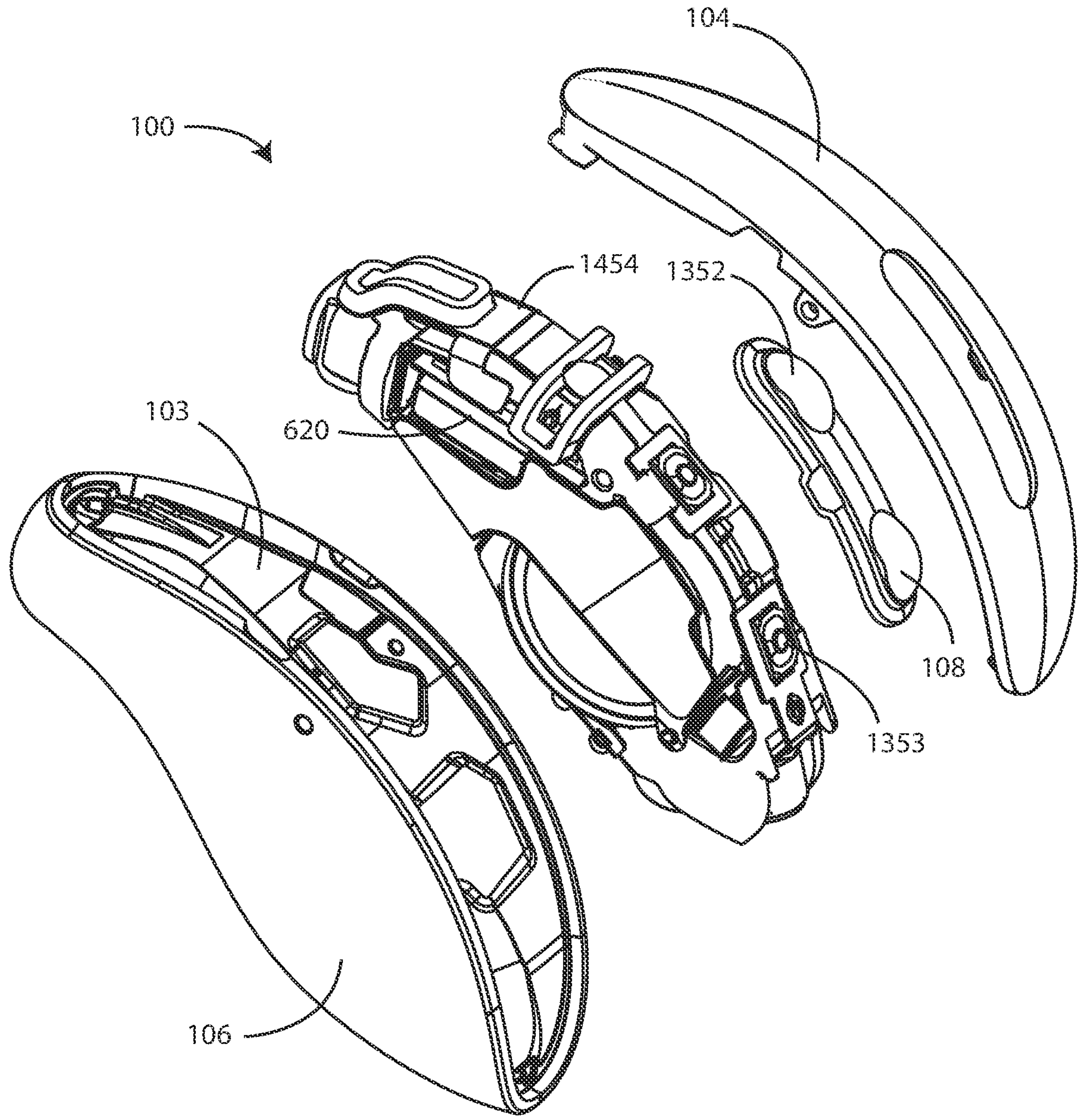
FIG. 13 is an exploded view of the hearing aid assembly in accordance with various embodiments herein.

Referring now to FIG. 13, an exploded view of the of the hearing aid assembly is shown in accordance with various embodiments herein. The hearing aid assembly 100 can include a top case 104 and a bottom case 106. The hearing aid assembly 100 can include electronics assembly 620 configured to fit within the top case 104 and the bottom case 106. The electronics assembly 620 includes a microphone circuit board 1454 on its top surface.

The hearing aid assembly can further include switch actuator 1352. Switch actuator 1352 can be configured to sit on top of electronics assembly 620 and include portions that protrude though one or more openings in the top case 104. In some embodiments, the electronics assembly can have one or more contacts 1353 configured to align with one or more switches or buttons on switch actuator 1352. In various embodiments, user input device 108 comprises the switch actuator 1352 and the contacts 1353.

Figure 14:
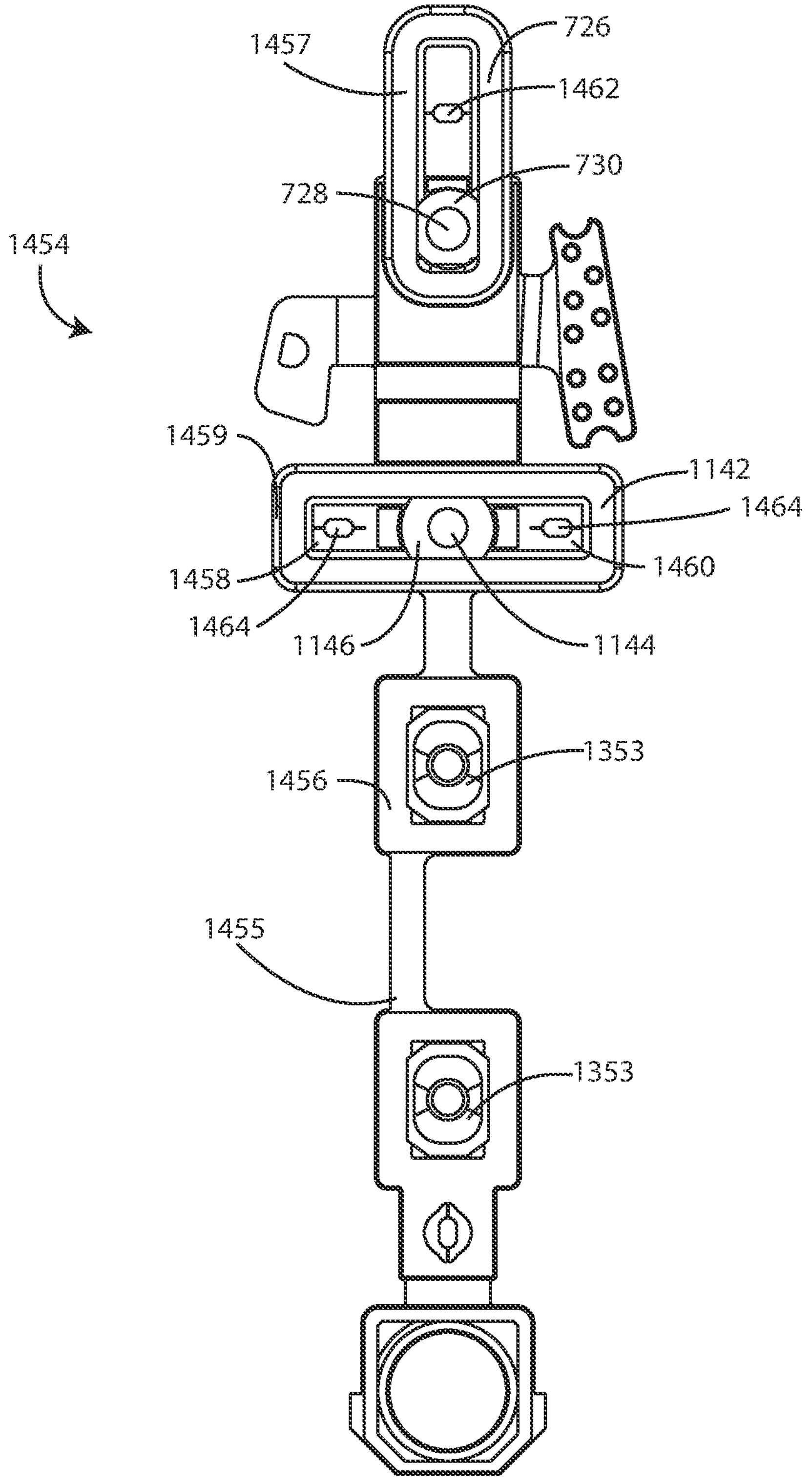
FIG. 14 is top view of a microphone circuit board in accordance with various embodiments herein.
Figure 15:
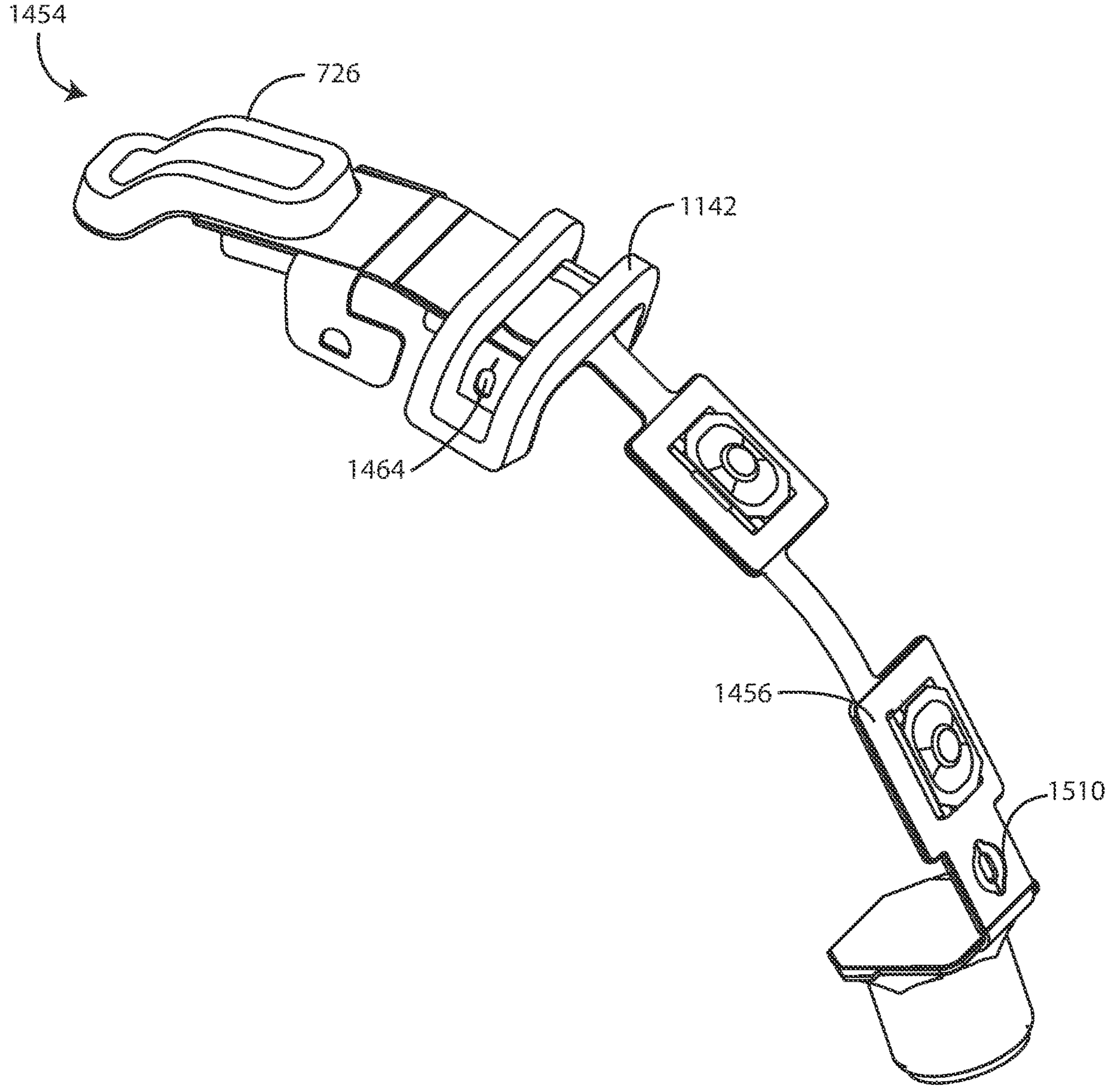
FIG. 15 is a top perspective view of the microphone circuit board in a curved configuration and in the behind-the-ear orientation in accordance with various embodiments herein.
Figure 16:
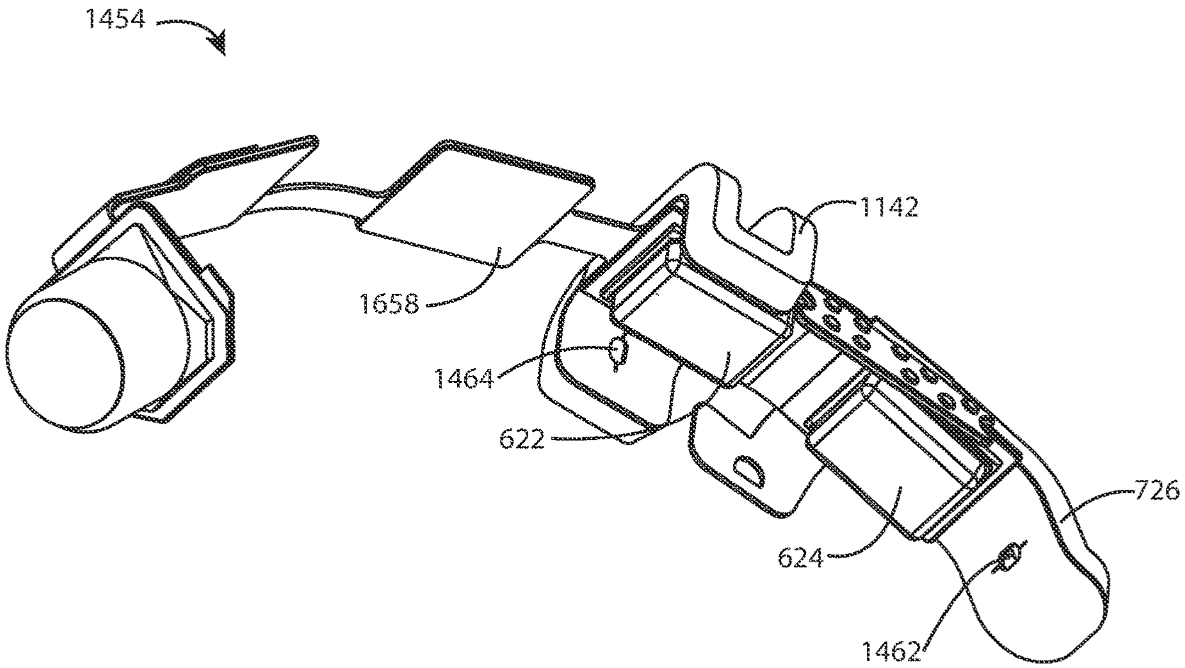
FIG. 16 is a bottom perspective view of the microphone circuit board of FIG. 15 in accordance with various embodiments herein.

FIGS. 14-16 show a microphone circuit board in accordance with various embodiments herein. FIG. 14 shows a top view of the microphone circuit board, FIG. 15 shows a top perspective view of the microphone circuit board in a curved configuration and a behind-the-ear orientation, and FIG. 16 shows a bottom perspective view of the microphone circuit board in a curved configuration and a behind-the-ear orientation. The microphone circuit board 1454 has a curved configuration as it is positioned within the electronics assembly 620, as shown in FIG. 13.

In various embodiments, the microphone circuit board 1454 can have a PCBA layer 1455 configured to contain one or more electronic components. In various embodiments, the PCBA layer 1455 is configured to be sufficiently flexible to conform to various components of the hearing aid assembly 100. For example, the PCBA layer 1455 allows the microphone circuit board 1454 to bend into the curved configuration shown in FIGS. 13, 15 and 16. In various embodiments, a microphone circuit board 1454 can have a top side 1456 and a bottom side 1658. The bottom side 1658 is configured to be operatively connected to the front microphone 622 and the rear microphone 624 of electronics assembly 620.

In various embodiments, the microphone circuit board defines a front microphone inlet 728 adjacent to the front microphone 622 and a rear microphone inlet 1144 adjacent to the rear microphone 624.

In various embodiments, the microphone circuit board 1454 can have a front mesh layer 730 that covers the front microphone inlet 728. The front mesh layer 730 can be attached to the top side 1456 of the microphone circuit board 1454. In various embodiments, the microphone circuit board 1454 can have a rear mesh layer 1146 that covers the rear microphone inlet 1144. The rear mesh layer 1146 can be attached to the top side 1456 of the microphone circuit board 1454.

In various embodiments, a microphone circuit board 1454 can have a board exterior perimeter 1459 and front protrusion portion 1457. In various embodiments, a front portion of the front gasket 726 is attached to the microphone circuit board 1454 along the board exterior perimeter 1459 at the front protrusion portion 1457.

In various embodiments, a microphone circuit board 1454 further includes a right protrusion portion 1460 and a left protrusion portion 1458. In various embodiments, a right portion of the rear gasket 1142 is attached to the microphone circuit board 1454 along the board exterior perimeter 1459 at the right protrusion portion 1460 and a left portion of the rear gasket 1142 is attached to the microphone circuit board 14554 along the board exterior perimeter 1459 at the left protrusion portion 1458.

Figure 17:
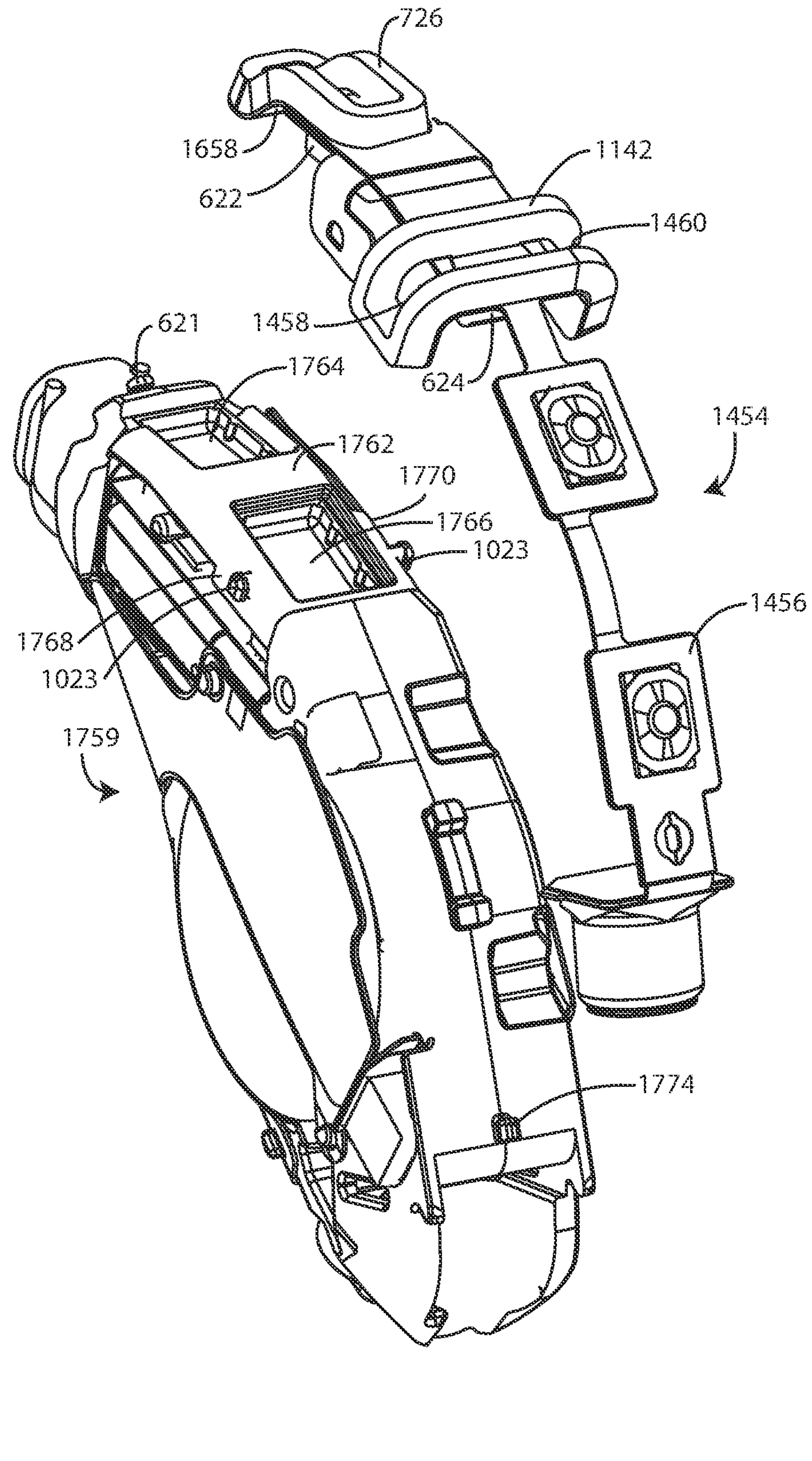
FIG. 17 is a partially exploded view of components of the electronics assembly of FIG. 13 in accordance with various embodiments herein.

Referring now to FIG. 17, a partially exploded view of components of an electronics assembly is shown in accordance with various embodiments herein. The electronics assembly 620 of hearing aid assembly 100 can include an inner case 1759 and a microphone circuit board 1454. Inner case 1759 and a microphone circuit board 1454 are configured to be positioned within the electronics cavity 103 of hearing aid assembly 100. The inner case 1759 provides a structure for securing many components of the hearing aid assembly.

In various embodiments, inner case 1759 can have an inner case top surface 1762. Inner case top surface 1762 can define a front microphone opening 1764 and a rear microphone opening 1766. In various embodiments, bottom side 1658 of the microphone circuit board 1454 is configured to attach to the inner case top surface 1762 of the inner case such that that the front microphone 622 is positioned in the front microphone opening 1764 and the rear microphone 624 is positioned in the rear microphone opening 1766.

In various embodiments, inner case 1759 further comprises a right surface 1770 and a left surface 1768 each extending away from the inner case top surface 1762. In various embodiments the right protrusion portion 1460 of microphone circuit board 1454 is configured to extend downward and attach to the right surface 1770 of the inner case 1759. In various embodiments the left protrusion portion 1458 of the microphone circuit board 1454 extends downward and is attached to the left surface 1768 of the inner case 1759. The two ends of the rear gasket 1142 are present on the right and left protrusion portions and extend downward along the left surface 1768 and the right surface 1770 of the inner case 1759 to form the right rear trap portion and the left rear trap portion of the rear acoustic passageway.

The microphone circuit board 1454 can attach to the inner case 1759 in a variety of ways. In various embodiments, surfaces of the inner case 1759 include one or more projections and the microphone circuit board 1454 defines one or more openings that receive the projections. The inner case 1759 can include one, two, three, four, five, six or more projections for interaction with openings on the microphone circuit board. In the embodiment of the FIGS., the inner case 1759 includes a front projection, right projection, left projection, and a rear projection.

FIGS. 6, 7, 8 and 14 illustrate a front projection 621 of the inner case 1759. As seen in FIGS. 14 and 16, the microphone circuit board 1454 defines a front opening 1462 which is configured to receive the front projection 621, so that the microphone circuit board is secured to the inner case 1759.

Left and right projections 1023 are present on the left surface and right surface of the inner case, respectively, as seen in FIGS. 10, 11, 12 and 17. The left protrusion portion 1458 and right protrusion portion 1460 of the microphone circuit board 1454 define openings 1464 (FIG. 14) for receiving the left and right projections 1023. As seen in FIG. 17, a rear projection 1774 can be provided on the inner case 1759. As seen in FIG. 15, a rear portion of the microphone circuit board 1454 can define a rear opening 1510 to receive the rear projection 1774, providing another attachment point between the microphone circuit board and the inner case 1759.

Referring to FIG. 1, In various embodiments, the housing 102 can have a groove 107 defined between the top case 104 and the bottom case 106. In some embodiment, the groove 107 is defined at least in portions adjacent to the front housing inlet 110, the right rear housing inlet 114, and the left rear housing inlet 112. In some embodiments, the groove 107 is defined around a top case exterior perimeter and a bottom case exterior perimeter.

The optional groove 107 is also visible in FIGS. 5, 8, 9, and 11. In various embodiments the groove has a groove depth less than the front trap portion 740 or left or right rear trap portions. The relative depth of the groove 107 compared to the left rear trap portion 1150 and right rear trap portion 1152 is best seen in FIG. 11. While not intending to be bound by theory, it is believed that the groove can provide an alternate acoustic pathway to the front or rear microphones in the event one of the front housing inlet 110, left rear housing inlet 112, or right rear housing inlets 114 becomes blocked with foreign matter at the level of the outer housing surface.

The hearing aid assembly 100 may be configured with additional materials to protect against the ingress of foreign matter. As one example, portions of a hearing assistance device may be engineered with a certain texture or coated in a hydrophobic material to repel water molecules, and portions of the hearing assistance device may be engineered with a different texture or coated in a hydrophilic material that tends to bond with water molecules. In this manner, the foreign matter is guided away from the hydrophobic material and towards the hydrophilic material. Based on the location of the hydrophilic and hydrophobic materials, it may be possible to slow the ingress of the foreign material in the hearing assistance device.

In some embodiments, texturing may be sufficient to form hydrophobic and/or hydrophilic portions without the need for additional coatings or materials (e.g., textures can achieve similar results as coatings).

In various embodiments, a hydrophilic coating is applied to at least one of the front trap portion 740, right rear trap portion 1152, and left rear trap portion 1150. In various embodiments, the entire hearing aid assembly 100 is treated with a hydrophobic coating. In an embodiment, the front trap portion 740 of the front acoustic passageway 734 and the left rear trap portion 1150 and the right rear trap portion 1152 of the rear acoustic passageway 1148 is left untreated while the remainder of the front acoustic passageway and rear acoustic passageway 1148 are treated with a hydrophobic coating. This can be accomplished by masking the trap portions when applying a hydrophobic coating.

In an embodiment, the trap portions are treated with a hydrophilic coating while the remainder of the front and rear acoustic passageways are treated with a hydrophobic coating.

In some embodiments, the hearing aid assembly 100 can include one or more heaters (not shown). In various embodiments, the one or more heaters are configured to configured to warm at least one of the front trap portion 740, right rear trap portion 1152, and left rear trap portion 1150. While not intending to be bound by theory, it is believed that warming the trap portions will evaporate moisture deposited in the trap portions.

In various embodiments, the hearing aid assembly 100 can include one or more heaters insert molded into at least one of the front gasket 726, rear gasket 1142, or the PCBA layer 1455 of the microphone circuit board 1454. In some embodiments, the heater is disposed outside of but adjacent to the front acoustic passageway 734. In some embodiments, the heater is disposed outside of but adjacent to the rear acoustic passageway 1148.

In various embodiments, the one or more heaters can include a resistive heating element, a foil heater, a foil layer, polyimide heating elements, polyester insultation, or the like.

Figure 18:
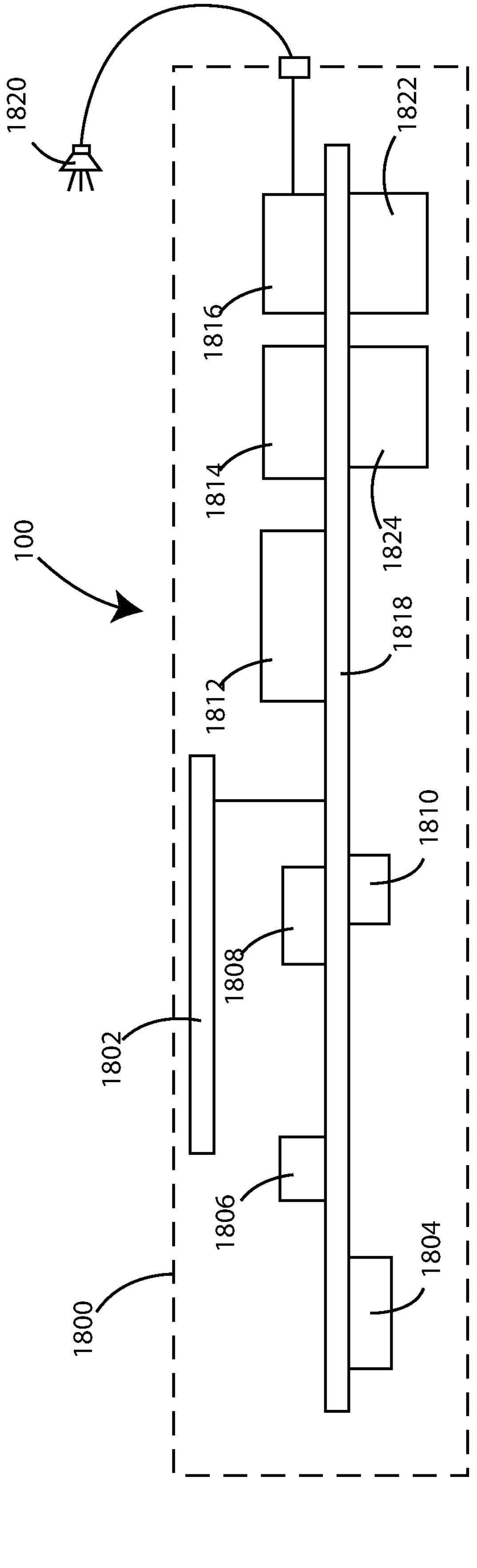
FIG. 18 is a schematic block diagram including various components of a hearing assistance device in accordance with various embodiments herein.

Referring now to FIG. 18, a schematic block diagram is shown with various components of a hearing assistance device in accordance with various embodiments. The block diagram of FIG. 18 represents a generic hearing assistance device for purposes of illustration. The hearing aid assembly 100 shown in FIG. 18 includes several components electrically connected to a flexible mother circuit 1818 (e.g., flexible mother board) which is disposed within housing 1800.

Although a single flexible mother circuit board 1818 is shown in schematic view of FIG. 18, in various embodiments, the components illustrated in FIG. 18 may be connected to two or more flexible circuit boards. For example, the components can be connected to a microphone circuit board 1454 of FIG. 17 and another circuit board positioned within the electronics assembly 620.

A power supply circuit 1804 can include a battery and can be electrically connected to the flexible mother circuit 1818 and provides power to the various components of the hearing assistance device. One or more microphones 1806 are electrically connected to the flexible mother circuit 1818, which provides electrical communication between the microphones 1806 and a digital signal processor (DSP) 1812. Among other components, the DSP 1812 incorporates or is coupled to audio signal processing circuitry configured to implement various functions described herein. A sensor package 1814 can be coupled to the DSP 1812 via the flexible mother circuit 1818. The sensor package 1814 can include one or more different specific types of sensors such as those described in greater detail below. One or more user switches 1810 (e.g., on/off, volume, mic directional settings) are electrically coupled to the DSP 1812 via the flexible mother circuit 1818.

The one or more microphones 1806 can include the front microphone 622 and the rear microphone 624 shown in various embodiments herein. The one or more switches can include the contacts 1353 of FIG. 14 shown in various embodiments herein.

An audio output device 1816 is operatively connected to the DSP 1812 via the flexible mother circuit 1818. In some embodiments, the audio output device 1816 comprises a speaker (coupled to an amplifier). In other embodiments, the audio output device 1816 comprises an amplifier coupled to an external receiver 1820 adapted for positioning within an ear of a wearer. The external receiver 1820 can include a transducer, speaker, or loudspeaker. In various embodiments, the external receiver 1820 can be positioned within the earbud 118 of FIG. 1 and connected with the remainder of the hearing assistance device via the cable 116 of FIG. 1. It will be appreciated that external receiver 1820 may, in some embodiments, be an electrode array transducer associated with a cochlear implant or brainstem implant device. The hearing aid assembly 100 may incorporate a communication device 1808 coupled to the flexible mother circuit 1818 and to an antenna 1802 directly or indirectly via the flexible mother circuit 1818. The communication device 1808 can be a Bluetooth® transceiver, such as a BLE (Bluetooth® low energy) transceiver or another transceiver (e.g., an IEEE 802.11 compliant device). The communication device 1808 can be configured to communicate with one or more external devices, such as those discussed previously, in accordance with various embodiments. In various embodiments, the communication device 1808 can be configured to communicate with an external visual display device such as a smart phone, a video display screen, a tablet, a computer, or the like.

In various embodiments, the hearing aid assembly 100 can also include a control circuit 1822 and a memory storage device 1824. The control circuit 1822 can be in electrical communication with other components of the device. The control circuit 1822 can execute various operations, such as those described herein. The control circuit 1822 can include various components including, but not limited to, a microprocessor, a microcontroller, an FPGA (field-programmable gate array) processing device, an ASIC (application specific integrated circuit), or the like. The memory storage device 1824 can include both volatile and non-volatile memory. The memory storage device 1824 can include ROM, RAM, flash memory, EEPROM, SSD devices, NAND chips, and the like. The memory storage device 1824 can be used to store data from sensors as described herein and/or processed data generated using data from sensors as described herein, including, but not limited to, information regarding exercise regimens, performance of the same, visual feedback regarding exercises, and the like.

In an embodiment, methods of forming of a hearing aid assembly is described herein. The method includes providing a top case and a bottom case configured to be connected to form a housing.

In an embodiment, the method can further include providing a user input device and an electronics assembly configured to be positioned within the electronics cavity of the housing. In various embodiments, the electronics assembly includes at least a microphone circuit board positioned on a top surface of an inner case and additional electronic components contained within the inner case, including a processor, a communication circuit, an antenna, and the like. During the assembly process, the microphone circuit board is positioned on the top surface of the inner case so that a front microphone is positioned within a front opening of the inner case and a rear microphone is positioned within a rear opening of the inner case. In one embodiment, the inner case includes projections that are received by openings defined in the microphone circuit board. The openings in the microphone circuit board are pressed over the projections of the inner case to secure the microphone circuit board to the inner case.

The microphone circuit board defines a front microphone inlet and a rear microphone inlet. A front mesh layer is attached to the top side of the microphone circuit board to cover the front microphone inlet and a rear mesh later is attached to the top side of the microphone circuit board to cover the rear microphone inlet. The front microphone is attached to a bottom side of the microphone circuit board adjacent to the front microphone inlet. The rear microphone is attached to the bottom side of the microphone circuit board adjacent to the rear microphone inlet.

In an embodiment, the method can further include attaching the microphone circuit board to an inner case. In various embodiments, the inner case comprises a top surface, defining a front microphone opening and a rear microphone opening. In various embodiments, the bottom side of the microphone circuit board is attached to the top surface of the inner case so that the front microphone is positioned in the front microphone opening and the rear microphone is positioned in the rear microphone opening.

In some embodiments, gaskets are placed on the microphone circuit board to surround a portion of the acoustic passageway. A front gasket can be placed on a front protrusion of the microphone circuit board to surround the portion of the microphone circuit board that will form the front acoustic passageway. A rear gasket can be placed on the microphone circuit board so that it extends across a right protrusion and a left protrusion of the microphone circuit board to surround the portion of the microphone circuit board that will form the rear acoustic passageway. The front gasket and rear gasket may be cut from a sheet of foam or other material and may include a pressure sensitive adhesive to connect them to the microphone circuit board.

During assembly, a user input device can be positioned over switch contacts on the microphone circuit board. The top case can include an opening to allow the user input device to protrude from the top case so that it can be activated by a user.

In an embodiment, the electronics assembly can be positioned within the bottom case and the top case may be connected to the bottom case to enclose the electronics assembly. The juncture between the top case and bottom case can define housing inlet, such as a front housing inlet, a rear left housing inlet and a rear right housing inlet. A front acoustic passageway extends inward from the front housing inlet to the front microphone inlet. The front acoustic passageway can be bounded by the microphone circuit board, the front mesh layer, front gasket, portions of the inner surface of the bottom case, and a bottom surface of the top case. A rear acoustic passageway extends inward from the left rear housing inlet and from the right rear housing inlet to the rear microphone inlet. The rear acoustic passageway can be bounded by the microphone circuit board, the rear mesh layer, rear gasket, portions of the inner surface of the bottom case, and the bottom surface of the top case.

In various embodiments, the front acoustic passageway has a front trap portion located below the front mesh layer when the housing is in the behind-the-ear orientation. In various embodiments, the rear acoustic passageway has a right rear trap portion and a left rear trap portion, and the right rear trap portion and the left rear trap portion are positioned below the rear mesh layer when the housing is in the behind-the-ear orientation.

Many different methods are contemplated herein, including, but not limited to, methods of making, methods of using, and the like. Aspects of system/device operation described elsewhere herein can be performed as operations of one or more methods in accordance with various embodiments herein.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, many variations and modifications may be made while remaining within the spirit and scope herein.

What is claimed is:

1. A hearing aid assembly comprising:

a housing comprising a top case and a bottom case, the housing being configured to rest against a user's outer ear in a behind-the-ear orientation, the housing defining:

an electronics cavity between the top case and the bottom case;

a front housing inlet between the bottom case and the top case;

a first rear housing inlet between the bottom case and the top case;

an electronics assembly positioned within the electronics cavity of the housing, the electronics assembly defining a front microphone inlet and a rear microphone inlet, wherein a front acoustic passageway extends inward from the front housing inlet to the front microphone inlet and a rear acoustic passageway extends inward from the first rear housing inlet to the rear microphone inlet, the electronics assembly comprising:

a front microphone;

a rear microphone;

a front mesh layer covering the front microphone inlet; and a rear mesh layer covering the rear microphone inlet;

wherein the front acoustic passageway comprises a front trap portion located below the front microphone inlet when the housing is in the behind-the-ear orientation; and wherein the rear acoustic passageway comprises a first rear trap portion, wherein the first rear trap portion is positioned below the rear microphone inlet when the housing is in the behind-the-ear orientation.

2. The hearing aid assembly of claim 1, wherein the front acoustic passageway further comprises:

a front microphone portion adjacent to the front mesh layer; and a front lateral portion between the front trap portion and the front microphone portion; and wherein the front trap portion is below the front lateral portion when the hearing aid assembly is in the behind-the-ear orientation.

3. The hearing aid assembly of claim 1, wherein the rear acoustic passageway further comprises:

a rear microphone portion adjacent to the rear mesh layer; and a rear lateral portion between the first rear trap portion and the rear microphone portion;

wherein, when the hearing aid assembly is in the behind-the-ear orientation, the first rear trap portion is below the rear lateral portion.

4. The hearing aid assembly of claim 1, wherein the electronics assembly further comprises:

a microphone circuit board having a top side and a bottom side, wherein the bottom side is operatively connected to the front microphone and the rear microphone, wherein the microphone circuit board defines the front microphone inlet adjacent to the front microphone and the rear microphone inlet adjacent to the rear microphone;

wherein the front mesh layer covers the front microphone inlet and is attached to the top side of the microphone circuit board; and wherein the rear mesh layer covers the rear microphone inlet and is attached to the top side of the microphone circuit board.

5. The hearing aid assembly of claim 1, further comprising a second rear housing inlet defined between the bottom case and the top case, wherein the second rear housing inlet is disposed on an opposite side of the housing from the first rear housing inlet, wherein the rear acoustic passageway extends inward from the second rear housing inlet to the rear microphone inlet, and wherein the rear acoustic passageway comprises a second rear trap portion, wherein the second rear trap portion is positioned below the rear microphone inlet when the housing is in the behind-the-ear orientation.

6. The hearing aid assembly of claim 4, further comprising an inner case positioned within the electronics cavity, wherein the inner case comprises a top surface, wherein the top surface of the inner case defines a front microphone opening and a rear microphone opening, wherein the bottom side of the microphone circuit board is attached to the top surface of the inner case so that the front microphone is positioned in the front microphone opening and the rear microphone is positioned in the rear microphone opening.

7. The hearing aid assembly of claim 1, wherein the housing defines a groove between the top case and the bottom case at least in portions adjacent to the front housing inlet and the first rear housing inlet.

8. The hearing aid assembly of claim 7, wherein the groove has a groove depth less than a front trap depth and a first rear trap depth.

9. The hearing aid assembly of claim 7, wherein the groove is defined around a top case exterior perimeter and a bottom case exterior perimeter.

10. The hearing aid assembly of claim 1, further comprising a heater configured to warm at least one of the group consisting of the front trap portion and the first rear trap portion.

11. The hearing aid assembly of claim 1, further comprising at least one of:

a hydrophilic coating in at least one of the group consisting of the front trap portion and the first rear trap portion, a front hydrophobic coating on portions of surfaces defining the front acoustic passageway, wherein the front hydrophobic coating is not present in surfaces defining the front trap portion, and a rear hydrophobic coating on portions of surfaces defining the rear acoustic passageway, wherein the rear hydrophobic coating is not present on surfaces defining the first rear trap portion.

12. The hearing aid assembly of claim 1, wherein in the behind-the-ear orientation, the front housing inlet and the first rear housing inlet are facing upward and a majority of the housing is below the front housing inlet and the first rear housing inlet.

13. The hearing aid assembly of claim 1, wherein the front housing inlet has a width of at least 0.20 mm.

14. A hearing aid assembly comprising:

a housing comprising a top case and a bottom case, the housing being configured to rest against a user's outer ear in a behind-the-ear orientation, the housing defining:

an electronics cavity between the top case and the bottom case;

a front housing inlet between the bottom case and the top case;

a left rear housing inlet between the bottom case and the top case;

a right rear housing inlet between the bottom case and the top case;

an electronics assembly positioned within the electronics cavity of the housing, the electronics assembly defining a front microphone inlet and a rear microphone inlet, wherein a front acoustic passageway extends inward from the front housing inlet to the front microphone inlet and a rear acoustic passageway extends inward from the left rear housing inlet and from the right rear housing inlet to the rear microphone inlet, the electronics assembly comprising:

a front microphone;

a rear microphone;

a front mesh layer covering the front microphone inlet;

a front gasket contacting a top case inner surface and a bottom case inner surface, the front gasket comprising an interior surface that surrounds a portion of the front acoustic passageway;

a rear mesh layer covering the rear microphone inlet; and a rear gasket contacting the top case inner surface and the bottom case inner surface, the rear gasket comprising an interior surface that surrounds a portion of the rear acoustic passageway;

wherein the front acoustic passageway comprises a front trap portion located below the front microphone inlet when the housing is in the behind-the-ear orientation; and wherein the rear acoustic passageway comprises a right rear trap portion and a left rear trap portion, wherein the right rear trap portion and the left rear trap portion are positioned below the rear microphone inlet when the housing is in the behind-the-ear orientation.

15. The hearing aid assembly of claim 14, further comprising at least one of:

a hydrophilic coating in at least one of the group consisting of the front trap portion, right rear trap portion, and left rear trap portion, a front hydrophobic coating on portions of surfaces defining the front acoustic passageway, wherein the front hydrophobic coating is not present in surfaces defining the front trap portion, and a rear hydrophobic coating on portions of surfaces defining the rear acoustic passageway, wherein the rear hydrophobic coating is not present on surfaces defining the right rear trap portion or left rear trap portion.

16. The hearing aid assembly of claim 14, wherein the electronics assembly further comprises:

a microphone circuit board having a top side and a bottom side, wherein the bottom side is operatively connected to the front microphone and the rear microphone, wherein the microphone circuit board defines the front microphone inlet adjacent to the front microphone and the rear microphone inlet adjacent to the rear microphone;

wherein the front mesh layer covers the front microphone inlet and is attached to the top side of the microphone circuit board; and wherein the rear mesh layer covers the rear microphone inlet and is attached to the top side of the microphone circuit board.

17. The hearing aid assembly of claim 16, wherein the microphone circuit board comprises a board exterior perimeter and front protrusion portion, wherein a front portion of the front gasket is attached to the microphone circuit board along the board exterior perimeter at the front protrusion portion.

18. The hearing aid assembly of claim 16, wherein the microphone circuit board comprises a board exterior perimeter, a right protrusion portion, and a left protrusion portion, wherein a right portion of the rear gasket is attached to the microphone circuit board along the board exterior perimeter at the right protrusion portion and a left portion of the rear gasket is attached to the microphone circuit board along the board exterior perimeter at the left protrusion portion.

19. The hearing aid assembly of claim 16, further comprising an inner case positioned within the electronics cavity, wherein the inner case comprises a top surface, wherein the top surface of the inner case defines a front microphone opening and a rear microphone opening, wherein the bottom side of the microphone circuit board is attached to the top surface of the inner case so that the front microphone is positioned in the front microphone opening and the rear microphone is positioned in the rear microphone opening.

20. The hearing aid assembly of claim 19, wherein the inner case further comprises a right surface and a left surface extending away from the top surface, wherein the microphone circuit board comprises a board exterior perimeter, a right protrusion portion, and a left protrusion portion, wherein a right portion of the rear gasket is attached to the microphone circuit board along the board exterior perimeter at the right protrusion portion and a left portion of the rear gasket is attached to the microphone circuit board along the board exterior perimeter at the left protrusion portion, wherein the right protrusion portion extends downward along and is attached to the right surface of the inner case to form the right rear trap portion, and wherein the left protrusion portion extends downward along and is attached to the left surface of the inner case to form the left rear trap portion.

21. A method of forming of a hearing aid assembly comprising:

providing a top case and a bottom case configured to be connected to form a housing, the housing being configured to rest against a user's outer ear in a behind-the-ear orientation, the housing defining:

an electronics cavity between the top case and the bottom case;

a front housing inlet between the bottom case and the top case;

a left rear housing inlet between the bottom case and the top case;

a right rear housing inlet between the bottom case and the top case;

providing an electronics assembly configured to be positioned within the electronics cavity of the housing, the electronics assembly defining a front microphone inlet and a rear microphone inlet, the electronics assembly comprising:

a front microphone;

a rear microphone;

a front mesh layer covering the front microphone inlet; and a rear mesh layer covering the rear microphone inlet;

positioning the electronics assembly within the bottom case; and connecting the top case to the bottom case to enclose the electronics assembly, wherein a front acoustic passageway extends inward from the front housing inlet to the front microphone inlet and a rear acoustic passageway extends inward from the left rear housing inlet and from the right rear housing inlet to the rear microphone inlet, wherein the front acoustic passageway comprises a front trap portion located below the front microphone inlet when the housing is in the behind-the-ear orientation, and wherein the rear acoustic passageway comprises a right rear trap portion and a left rear trap portion, wherein the right rear trap portion and the left rear trap portion are positioned below the rear microphone inlet when the housing is in the behind-the-ear orientation.

22. The method of forming of a hearing aid assembly of claim 21, wherein providing an electronics assembly further comprises:

providing a microphone circuit board having a top side and a bottom side, wherein the bottom side is operatively connected to the front microphone and the rear microphone, wherein the microphone circuit board defines the front microphone inlet adjacent to the front microphone and the rear microphone inlet adjacent to the rear microphone, wherein the front mesh layer covers the front microphone inlet and is attached to the top side of the microphone circuit board, and wherein the rear mesh layer covers the rear microphone inlet and is attached to the top side of the microphone circuit board; and attaching the microphone circuit board to an inner case, wherein the inner case comprises a top surface, wherein the top surface of the inner case defines a front microphone opening and a rear microphone opening, wherein the bottom side of the microphone circuit board is attached to the top surface of the inner case so that the front microphone is positioned in the front microphone opening and the rear microphone is positioned in the rear microphone opening.

* * * * *